US012705153B2

(12) United States Patent
Aurongzeb et al.

(10) Patent No.: US 12,705,153 B2
(45) Date of Patent: Aug. 11, 2026

(54) SYSTEM AND METHOD FOR RECOMMENDING CONFIGURATION ADJUSTMENTS BASED ON CONFIGURATIONS AT SIMILARLY CAPABLE INFORMATION HANDLING SYSTEMS WITH LOWER CARBON FOOTPRINTS

(71) Applicant: Dell Products, LP, Round Rock, TX (US)

(72) Inventors: Deeder M. Aurongzeb, Austin, TX (US); Malathi Ramakrishnan, Madurai (IN); Parminder Singh Sethi, Punjab (IN)

(73) Assignee: DELL PRODUCTS LP, Round Rock, TX (US)

( * ) Notice: Subject to any disclaimer, the term of this patent is extended or adjusted under 35 U.S.C. 154(b) by 1048 days.

(21) Appl. No.: 17/877,012

(22) Filed: Jul. 29, 2022

(65) Prior Publication Data

US 2024/0037002 A1 Feb. 1, 2024

(51) Int. Cl.
*G06F 11/30* (2006.01)
*G06F 9/50* (2006.01)
(Continued)

(52) U.S. Cl.
CPC ........ *G06F 11/3058* (2013.01); *G06F 9/5094* (2013.01); *G06F 11/3409* (2013.01); *G06N 20/00* (2019.01)

(58) Field of Classification Search
CPC ............... G06F 11/3058; G06F 9/5094; G06F 11/3409; G06F 9/542; G06N 20/00; G06N 20/20
(Continued)

(56) References Cited

U.S. PATENT DOCUMENTS 7,480,640 B1 * 1/2009 Elad ....................... G06Q 10/10
706/14
7,694,291 B2 4/2010 Chen
(Continued)

FOREIGN PATENT DOCUMENTS

WO 2011/106160 A2 9/2011

OTHER PUBLICATIONS

C. Herrmann, et al., "Sustainability as Strategic Business Model for Profitable Business," 6 pages, May 2014.
(Continued)

*Primary Examiner* — Ann J Lo
(74) *Attorney, Agent, or Firm* — Prol Intellectual Property Law, PLLC; H. Kenneth Prol

(57) ABSTRACT

A usage profile based CO2 optimization system of an information handling system may comprise a processor to determine, using an ensemble machine-learning algorithm, rankings for user-disruptive static system configurations for a plurality of client information handling systems according to a level at which each user-disruptive static system configuration impacts carbon footprints of the client information handling systems, determine the first and second client information handling systems have matching values for a highest ranked user-disruptive static system configuration and mismatching values for an adjustable dynamic system configuration, determine the first client information handling system has a smaller carbon footprint than the second client information handling system, a network interface device to transmit a recommendation to the second client information handling system to adopt the value for the adjustable dynamic system configuration at the first client information handling system to decrease the carbon footprint of the second client information handling system.

20 Claims, 5 Drawing Sheets

(51) Int. Cl.
*G06F 11/34* (2006.01)
*G06N 20/00* (2019.01)

(58) Field of Classification Search
USPC .......................................................... 706/20
See application file for complete search history.

(56) References Cited

U.S. PATENT DOCUMENTS

| | | | | |
|---|---|---|---|---|
| 8,626,450 | B2 | 1/2014 | Dooley | |
| 8,904,374 | B2 | 12/2014 | Nakamura | |
| 9,760,474 | B2 | 9/2017 | Pillai | |
| 10,146,286 | B2 | 12/2018 | Lee | |
| 10,254,808 | B2 | 4/2019 | Messick | |
| 10,289,184 | B2 | 5/2019 | Malik | |
| 10,438,212 | B1 | 10/2019 | Jilani | |
| 10,705,786 | B2 | 7/2020 | Liu | |
| 10,938,954 | B2 | 3/2021 | Lee | |
| 10,977,293 | B2 | 4/2021 | Cai | |
| 11,009,938 | B1 | 5/2021 | Law | |
| 2009/0292617 | A1 | 11/2009 | Sperling | |
| 2010/0070404 | A1 | 3/2010 | McConnell | |
| 2012/0053925 | A1 | 3/2012 | Geffin | |
| 2014/0100937 | A1 | 4/2014 | Na | |
| 2014/0316964 | A1 | 10/2014 | Slutsker | |
| 2016/0359872 | A1* | 12/2016 | Yadav | H04L 63/1425 |
| 2017/0123857 | A1 | 5/2017 | Khan | |
| 2018/0293501 | A1 | 10/2018 | Ambati | |
| 2019/0349321 | A1 | 11/2019 | Cai | |
| 2021/0004328 | A1 | 1/2021 | Wang | |
| 2021/0125129 | A1* | 4/2021 | Vega | G06Q 10/06315 |
| 2021/0373638 | A1 | 12/2021 | Schluessler | |
| 2022/0036123 | A1* | 2/2022 | Cummings | G06V 10/82 |
| 2022/0044120 | A1 | 2/2022 | Pham | |
| 2022/0309436 | A1* | 9/2022 | Evans | G06Q 10/06375 |
| 2023/0260767 | A1* | 8/2023 | Hong | G06N 7/01 216/60 |

OTHER PUBLICATIONS

A. Stenhall, "What is the carbon footprint of a typical corporate laptop?," 4 pages, Oct. 2020 https://climatesmartit.com/2020/10/25/what-is-the-carbon-footprint-of-a-typical-corporate-laptop/.

K. Abnett, et al., "EU proposes world's first carbon border tax for some imports," 8 pages, Jul. 2021 https://www.reuters.com/business/sustainable-business/eu-proposes-worlds-first-carbon-border-tax-some-imports-2021-07-14/.

* cited by examiner

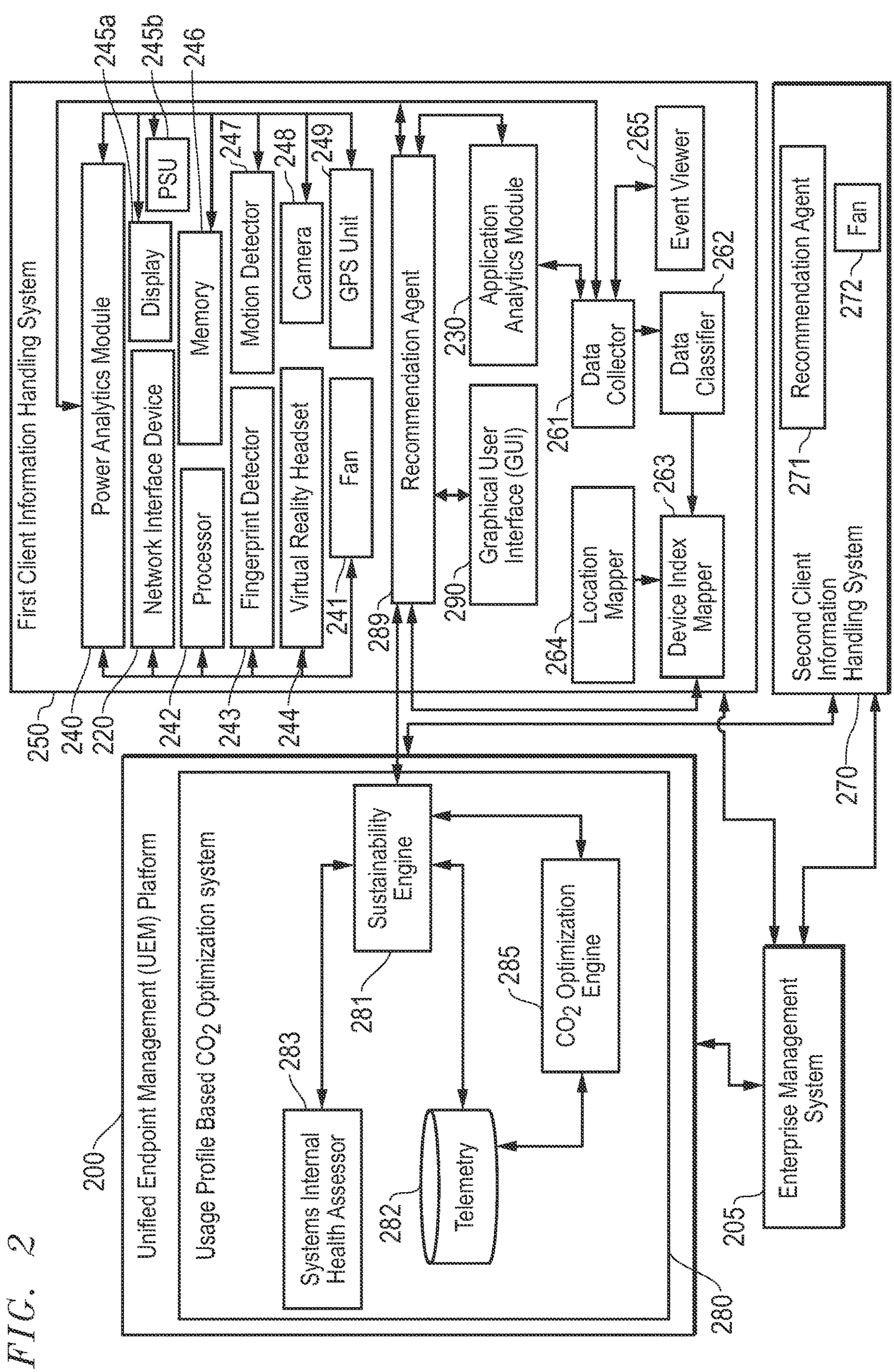
FIG. 2
First Client Information Handling System
250
Power Analytics Module
240
Network Interface Device
220
Display
245a
PSU
245b
Memory
246
Processor
242
Motion Detector
247
Camera
248
GPS Unit
249
Fingerprint Detector
243
Virtual Reality Headset
244
Fan
241
Recommendation Agent
289
Application Analytics Module
230
Graphical User Interface (GUI)
290
Data Collector
261
Data Classifier
262
Event Viewer
265
Location Mapper
264
Device Index Mapper
263
Second Client Information Handling System
270
Recommendation Agent
271
Fan
272
Unified Endpoint Management (UEM) Platform
200
Usage Profile Based CO2 Optimization system
280
Sustainability Engine
281
Systems Internal Health Assessor
283
Telemetry
282
CO2 Optimization Engine
285
Enterprise Management System
205

*FIG. 3*

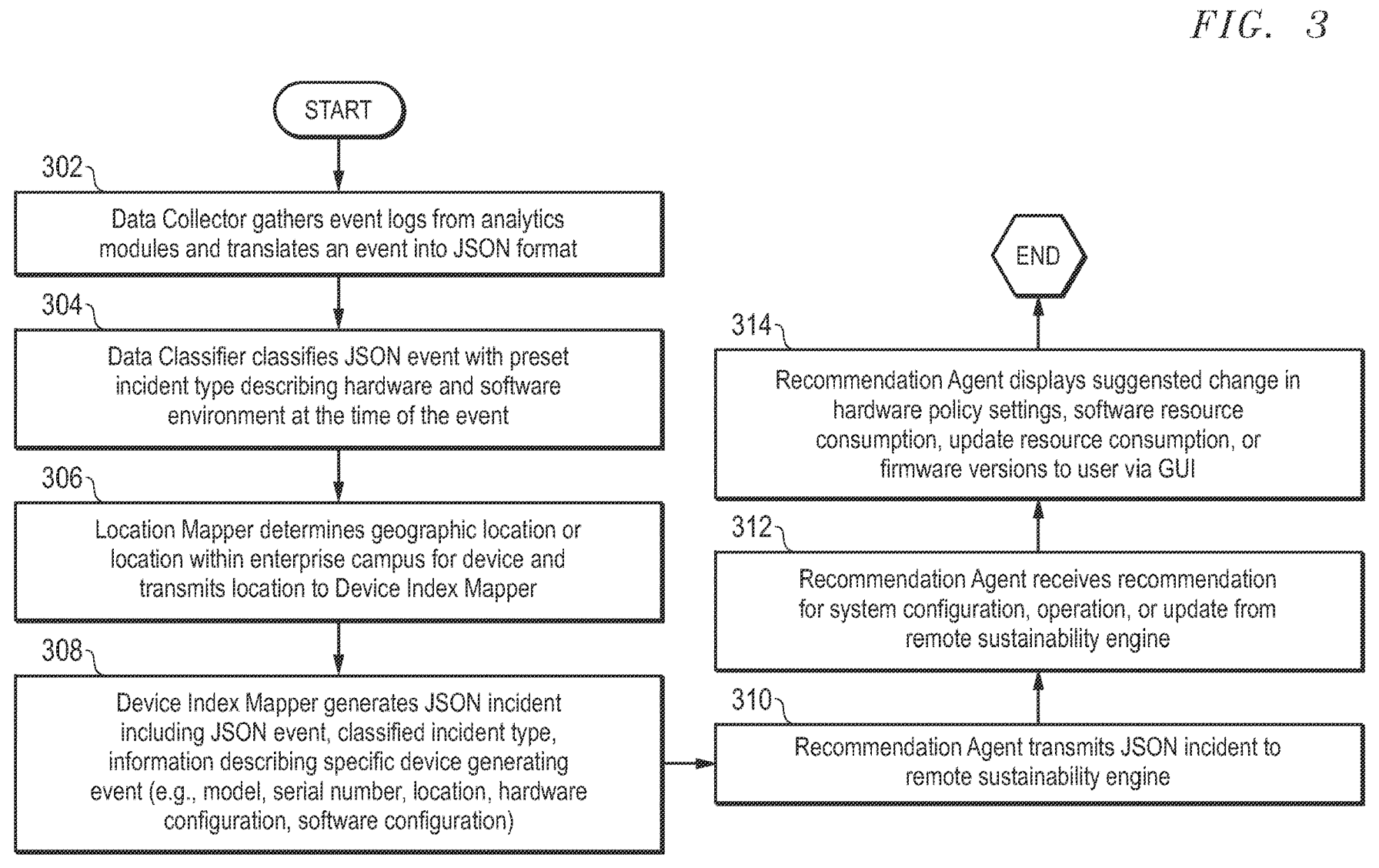

START

302 Data Collector gathers event logs from analytics modules and translates an event into JSON format 304 Data Classifier classifies JSON event with preset incident type describing hardware and software environment at the time of the event 306 Location Mapper determines geographic location or location within enterprise campus for device and transmits location to Device Index Mapper 308 Device Index Mapper generates JSON incident including JSON event, classified incident type, information describing specific device generating event (e.g., model, serial number, location, hardware configuration, software configuration)

310 Recommendation Agent transmits JSON incident to remote sustainability engine 312 Recommendation Agent receives recommendation for system configuration, operation, or update from remote sustainability engine 314 Recommendation Agent displays suggensted change in hardware policy settings, software resource consumption, update resource consumption, or firmware versions to user via GUI

END

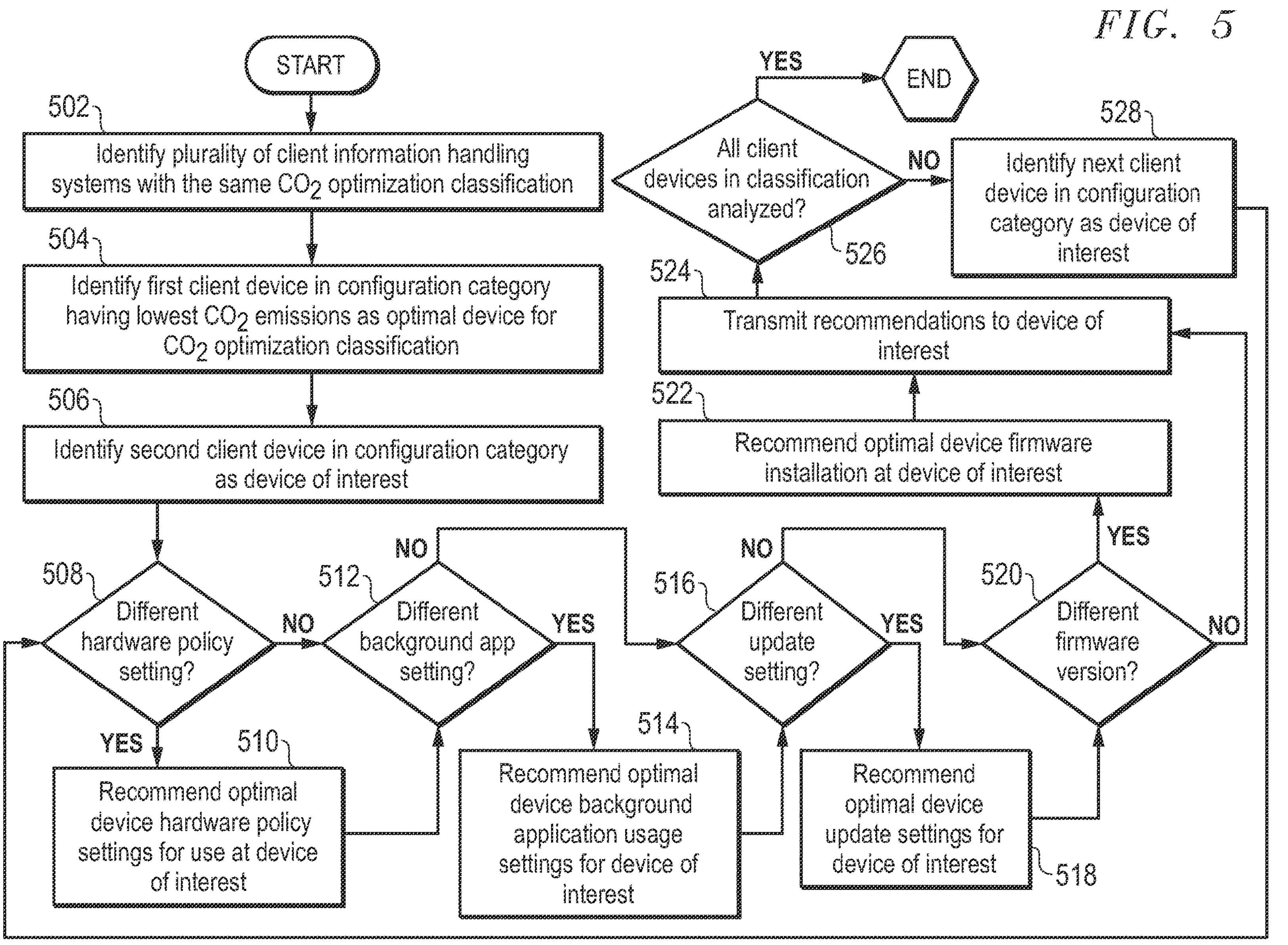

FIG. 5
START
502
Identify plurality of client information handling systems with the same $CO_2$ optimization classification
504
Identify first client device in configuration category having lowest $CO_2$ emissions as optimal device for $CO_2$ optimization classification
506
Identify second client device in configuration category as device of interest
508
Different hardware policy setting?
YES
NO
510
Recommend optimal device hardware policy settings for use at device of interest
512
Different background app setting?
YES
NO
514
Recommend optimal device background application usage settings for device of interest
516
Different update setting?
YES
NO
518
Recommend optimal device update settings for device of interest
520
Different firmware version?
YES
NO
522
Recommend optimal device firmware installation at device of interest
524
Transmit recommendations to device of interest
526
All client devices in classification analyzed?
YES
NO
END
528
Identify next client device in configuration category as device of interest

SYSTEM AND METHOD FOR RECOMMENDING CONFIGURATION ADJUSTMENTS BASED ON CONFIGURATIONS AT SIMILARLY CAPABLE INFORMATION HANDLING SYSTEMS WITH LOWER CARBON FOOTPRINTS

FIELD OF THE DISCLOSURE

The present disclosure generally relates to determining adjustments to be made to an information handling system hardware configuration or software configuration to minimize carbon footprint. More specifically, the present disclosure relates to a machine learning system for generating recommendations for changes to adjustable dynamic system configurations across a plurality of client information handling systems with similar carbon footprints based on an optimal usage or configuration to minimize carbon footprints across all client information handling systems within a same CO2 optimization classification group.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, video communication capabilities, and audio capabilities.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 2 is a block diagram illustrating a usage profile based CO2 optimization system according to an embodiment of the present disclosure;

FIG. 3 is a flow diagram illustrating a method of transmitting telemetry data for a client information handling system according to an embodiment of the present disclosure;

FIG. 5 is a flow diagram illustrating a method of recommending hardware, software, or firmware usage or configuration adjustments to minimize carbon footprint according to an embodiment of the present disclosure.

The use of the same reference symbols in different drawings may indicate similar or identical items.

DETAILED DESCRIPTION OF THE DRAWINGS

Figure 1:
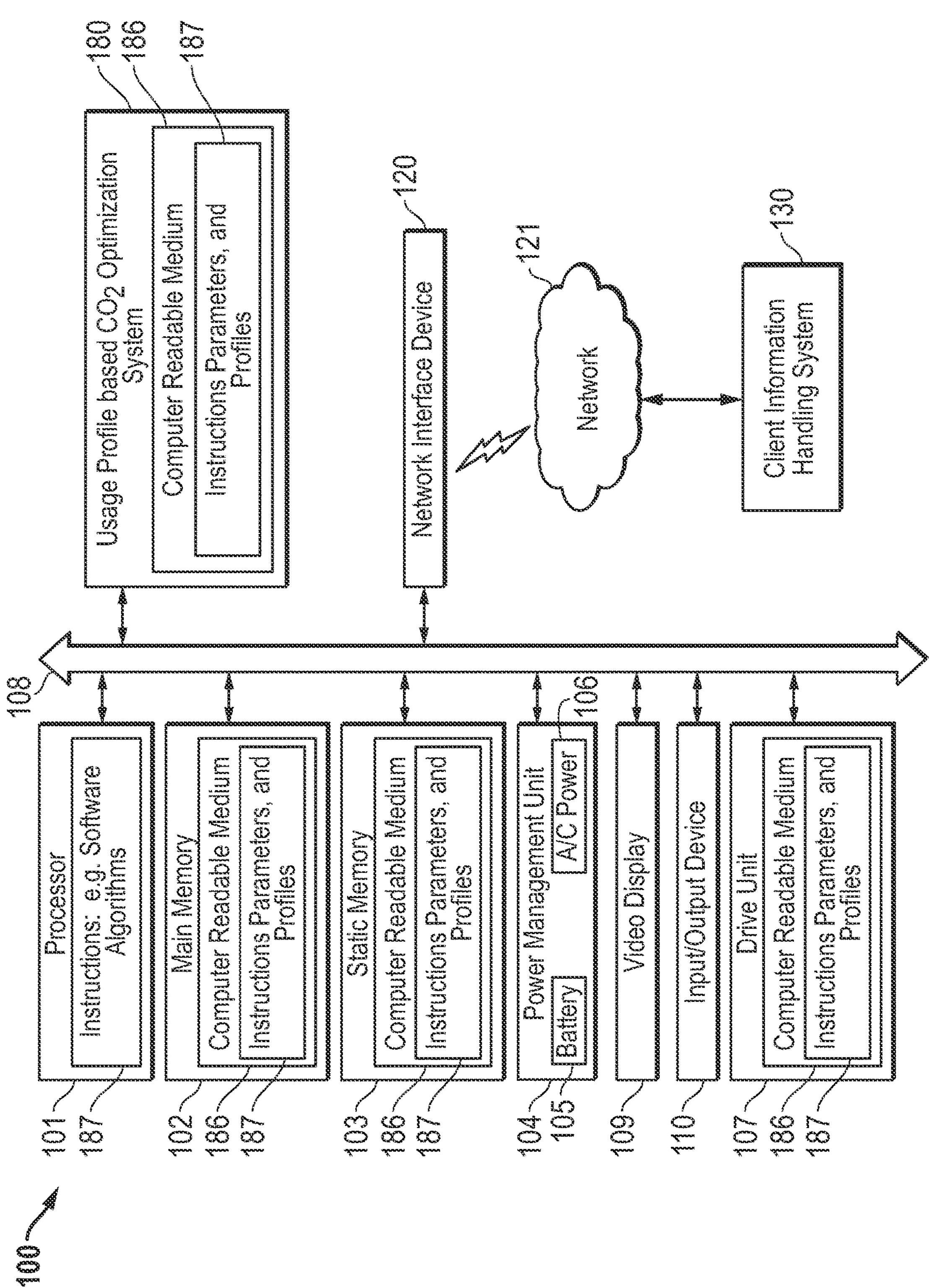
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Consumers are placing an ever increasing value on minimizing greenhouse gas (GHG) emissions generated during manufacture and usage of products they purchase. In other words, the size of GHG emissions generated during manufacture or use of a product is projected to sway an end consumer's purchasing decision to an increasingly large degree over the coming years. One way to minimize carbon footprint at one client information handling system is to adjust functionality of that client information handling system to mimic functionality at another client information handling system with a lower carbon footprint. However, this may only be feasible or successful if the two client information handling systems have roughly similar functionalities. For example, it may not be feasible to adjust the amount of power consumed by a liquid crystal display (LCD) at a first client information handling system to match an amount of power consumed by an organic light emitting diode (OLED) display if the minimum power required to operate the LCD is higher than power consumed by the OLED display. As another example, it may be impractical to recommend that a user change the city in which the client information handling system is operating to the same city in which the second client information handling system is operating, even though the city for the second client information handling system uses more green energy, resulting in the lower carbon footprint for the second client information handling system. These are only a few examples of user-disruptive static system configuration that is not easily adjusted by a user without replacement of existing hardware components or significant impact on user experience. Such user-disruptive static system configurations may form a usage profile that dictates one or more system configurations not easily adjustable, but that likely impact carbon footprint at a given client information handling system.

The usage profile based CO2 optimization system in embodiments of the present disclosure addresses these problems by grouping client information handling systems according to similarity of user-disruptive static system configurations (e.g., usage profiles) that are likely to impact carbon footprint. In various embodiments, the usage profile based CO2 optimization system may employ ensemble machine-learning algorithms to rank the impact of such user-disruptive static system configurations on carbon footprint. The usage profile based CO2 optimization system may then group client information handling systems into CO2 optimization classification groups according to the similarity of their highest-ranking user-disruptive static system configurations. In such a way, the usage profile based CO2 optimization system may identify client information handling systems having similar enough operating capabilities such that mimicking adjustable dynamic system configurations across those client information handling systems may minimize the carbon footprints of such devices. In other words, the hardware components installed, software applications executed, location-based CO2 emissions, and hardware health (all of which may form user-disruptive static system configurations) may be sufficiently similar across devices within the same CO2 optimization classification group that recommended adjustments to adjustable dynamic system configurations (e.g., hardware policy settings, background software application usage, update settings for firmware or hardware) at a device with a higher carbon footprint based on adjustable dynamic system configurations at another device in the same CO2 optimization classification group with a lower carbon footprint may successfully reduce the carbon footprint at the higher carbon footprint device. In such a way, the usage profile based CO2 optimization system may recommend changes to the adjustable dynamic system configurations (e.g., hardware, software, or firmware usage or configuration) across a plurality of client information handling systems with similar carbon footprints based on an optimal usage or configuration to minimize carbon footprint across all client information handling systems within the same CO2 optimization classification group.

FIG. 1 illustrates an information handling system 100 according to several aspects of the present disclosure. In particular, in the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), a server (e.g., blade server or rack server), a wired or wireless docking station for a mobile information handling system, a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a tablet computer, a desktop computer, an augmented reality system, a virtual reality system, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a server or as a client computer in a server-client network environment, or as a peer computer system in a peer-to-peer (or distributed) network environment. In a particular embodiment, the information handling system 100 may be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include a memory 102, (with computer readable medium 186 that is volatile (e.g. random-access memory, etc.), nonvolatile memory (read-only memory, flash memory etc.) or any combination thereof), one or more processing resources, such as a central processing unit (CPU), a graphics processing unit (GPU), a Visual Processing Unit (VPU) or a Hardware Accelerator, any one of which may be the processor 101 illustrated in FIG. 1, hardware or software control logic, or any combination thereof. Additional components of the information handling system 100 may include one or more storage devices 103 or 107, a wireless network interface device 160, one or more communications ports for communicating with external devices, as well as various input and output (I/O) devices 110, such as a keyboard, a mouse, touchpad or any combination thereof. A power management unit 104 supplying power to the information handling system 100, via a battery 105 or an alternating current (A/C) power adapter 106 may supply power to one or more components of the information handling system 100, including the processor 101 executing code instructions of the usage profile based CO2 optimization system 180, the wireless network interface device 160, a static memory 103 or drive unit 107, a, a video display 109 or other components of an information handling system. The video display 109 in an embodiment may function as a liquid crystal display (LCD), an organic light emitting diode (OLED), a flat panel display, or a solid-state display. The information handling system 100 may also include one or more buses (e.g., 108) operable to transmit communications between the various hardware components. Portions of an information handling system 100 may themselves be considered information handling systems 100 in the embodiments presented herein.

Information handling system 100 may include devices or modules that embody one or more of the devices or execute instructions for the one or more systems and modules described herein, and operates to perform one or more of the methods described herein. The information handling system 100 may execute code instructions 187, such as for the usage profile based CO2 optimization system 180 that may operate on servers or systems, remote data centers, or on-box in individual client information handling systems 100 according to various embodiments herein. In some embodiments, it is understood any or all portions of code instructions 187 may operate on a plurality of information handling systems 100.

The information handling system 100 may include a processor 101 such as a central processing unit (CPU), a graphics processing unit (GPU), a Visual Processing Unit (VPU), or a hardware accelerator, embedded controllers or control logic or some combination of the same. Any of the processing resources may operate to execute code that is either firmware or software code. Moreover, the information handling system 100 may include memory such as main memory 102, static memory 103, containing computer readable medium 186 storing instructions 187. In some embodiments, information handling system 100, or portions thereof, may represent a client information handling system operating various hardware components (e.g., processor 101, memory 102, network interface device 160, power management unit 104) in need of occasional replacement, and executing an agent of the usage profile based CO2 optimization system 180, as described in greater detail below with respect to FIG. 2. In other embodiments the information handling system 100 may represent a server information handling system a usage profile based CO2 optimization system 180, operating system (OS) software, application software, BIOS software, or other software applications or drivers detectable by processor type 101.

The disk drive unit 107 and static memory 103 may also contain space for data storage in a computer readable medium 186. The instructions 187 in an embodiment may reside completely, or at least partially, within the main memory 102, the static memory 103, and/or within the disk drive 107 during execution by the processor 101. The information handling system 100 may also include one or more buses 108 operable to transmit communications between the various hardware components such as any combination of various input and output (I/O) devices 110, or the like.

The network interface device 160 may provide connectivity of the information handling system 100 to the network 170 via a dedicated link, a network AP or base station in an embodiment. The network 170 in other embodiments may be a wired local area network (LAN), a wireless personal area network (WPAN), a wireless Local Area Network (WLAN), such as a public Wi-Fi communication network, a private Wi-Fi communication network, or other non-cellular communication networks. In other embodiments, the network 170 may be a wired wide area network (WAN), a wireless wide area network (WWAN), such as a 4G LTE public network, or a 5G communication network, or other cellular communication networks, including future protocol communication networks such as upcoming 6G protocols under development. Connectivity to any of a plurality of networks 170, one or more APs for those networks, or to a docking station in an embodiment may be via wired or wireless connection. In some aspects of the present disclosure, the network interface device 160 may operate two or more wireless links. In other aspects of the present disclosure, the information handling system 100 may include a plurality of network interface devices, each capable of establishing a separate wireless link to network 170, such that the information handling system 100 may be in communication with network 170 via a plurality of wireless links.

The network interface device 160 may operate in accordance with any cellular wireless data communication standards. To communicate with a wireless local area network, standards including IEEE 802.11 WLAN standards, IEEE 802.15 WPAN standards, or similar wireless standards may be used. Utilization of radiofrequency communication bands according to several example embodiments of the present disclosure may include bands used with the WLAN standards which may operate in both licensed and unlicensed spectrums. For example, WLAN may use frequency bands such as those supported in the 802.11 a/h/j/n/ac/ax including Wi-Fi 6 and Wi-Fi 6e. It is understood that any number of available channels may be available in WLAN under the 2.4 GHz, 5 GHz, or 6 GHz bands which may be shared communication frequency bands with WWAN protocols in some embodiments.

The network interface device 160, in other embodiments, may connect to any combination of cellular wireless connections including 2G, 2.5G, 3G, 4G, 5G or the like from one or more service providers or privately administered by an enterprise. Utilization of radiofrequency communication bands according to several example embodiments of the present disclosure may include bands used with the WWAN standards, which may operate in both licensed and unlicensed spectrums. More specifically, the network interface device 160 in an embodiment may transceive within radio frequencies associated with the 5G New Radio (NR) Frequency Range 1 (FR1) or Frequency Range 2 (FR2). NRFR1 may include radio frequencies below 6 GHz, also sometimes associated with 4G LTE and other standards predating the 5G communications standards. NRFR2 may include radio frequencies above 6 GHz, made available within the emerging 5G communications standard. Frequencies related to the 5G networks may include high frequency (HF) band, very high frequency (VHF) band, ultra-high frequency (UHF) band, L band, S band, C band, X band, Ku band, K band, Ka band, V band, W band, and millimeter wave bands.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations may include distributed processing, component/object distributed processing, and parallel processing. Alternatively, virtual computer system processing may be constructed to implement one or more of the methods or functionalities as described herein.

The present disclosure contemplates a computer-readable medium that includes instructions, parameters, and profiles 187 or receives and executes instructions, parameters, and profiles 187 responsive to a propagated signal, so that a device connected to a network 170 may communicate voice, video or data over the network 170. Further, the instructions 187 may be transmitted or received over the network 170 via the network interface device 160. The information handling system 100 may include a set of instructions 187 that may be executed to cause the computer system to perform any one or more of the methods or computer-based functions disclosed herein, such as classifying remote client information handling systems (e.g., 150) by similarity of operating environments, providing recommendations for extension of life for underperforming hardware components based on user-approved recommendations to other client devices within the same class, and rewarding users for execution of such recommendations. For example, instructions 187 may include a particular example of a usage profile based CO2 optimization system 180, or other aspects or components. Various software modules comprising application instructions 187 may be coordinated by an operating system (OS), and/or via an application programming interface (API). An example operating system may include Windows®, Android®, and other OS types. Example APIs may include Win 32, Core Java API, or Android APIs. Application instructions 187 may also include any application processing drivers, or the like executing on information handling system 100.

The usage profile based CO2 optimization system 180 may utilize a computer-readable medium 186 in which one or more sets of instructions 187 may operate in part as software or firmware instructions executed on the information handling system 100. The instructions 187 may embody one or more of the methods or logic as described herein. For example, instructions relating to the usage profile based CO2 optimization system 180, firmware or software algorithms, processes, and/or methods may be stored here. Such instructions 187 may comprise providing recommendations changes to adjustable dynamic system configurations (e.g., hardware, software, or firmware usage or configuration) across a plurality of client information handling systems with similar carbon footprints based on an optimal usage or configuration to minimize carbon footprint across all client information handling systems within the same CO2 optimization classification group. The usage profile based CO2 optimization system 180 may operate within a Unified Endpoint Management (UEM) platform that gathers telemetries from a plurality of client information handling system 150 endpoints via the network 170 that describe operating environments for those client information handling systems (e.g., 150). The UEM platform in an embodiment may operate to identify information technology (IT) issues at client information handling systems 150, and to provide support for such issues, including automatically updating drivers or hardware components, as needed. The UEM platform in an embodiment may operate as a cloud-based service to store data (e.g., operating environment telemetries for remote client information handling systems 150) within memory 102, static memory 103, or computer readable medium 186 received via network 170. In some embodiments the information handling system 100 may be a sever executing a UEM platform. In other embodiments, the information handling system 100 may depict a client information handling system (e.g., 150) that reports to a UEM and receives recommendations from the UEM pursuant to various embodiments described herein.

Main memory 102 may contain computer-readable medium (not shown), such as RAM in an example embodiment. An example of main memory 102 includes random access memory (RAM) such as static RAM (SRAM), dynamic RAM (DRAM), non-volatile RAM (NV-RAM), or the like, read only memory (ROM), another type of memory, or a combination thereof. Static memory 103 may contain computer-readable medium (not shown), such as NOR or NAND flash memory in some example embodiments. The instructions, parameters, and profiles 187 of the usage profile based CO2 optimization system 180 may be stored in static memory 103, or the drive unit 107 on a computer-readable medium 186 such as a flash memory or magnetic disk in an example embodiment. More specifically, telemetries describing heat measurements, executing software applications, and errors associated with one or more hardware components of client information handling systems (e.g., 150) may be stored within memory 102, static memory 103, or drive unit 107.

While the computer-readable medium is shown to be a single medium, the term "computer-readable medium" includes a single-medium or multiple-media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random-access memory or other volatile re-writable memory. Additionally, the computer-readable medium may include a magneto-optical or optical medium, such as a disk or tapes or other storage device to store information received via carrier wave signals such as a signal communicated over a transmission medium. Furthermore, a computer readable medium may store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In some embodiments, dedicated hardware implementations such as application specific integrated circuits, programmable logic arrays and other hardware devices may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

When referred to as a "system", a "device," a "module," a "controller," or the like, the embodiments described herein may be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module may include software, including firmware embedded at a device, such as an Intel® Core class processor, ARM® brand processors, Qualcomm® Snapdragon processors, or other processors and chipsets, or other such device, or software capable of operating a relevant environment of the information handling system. The system, device, controller, or module may also include a combination of the foregoing examples of hardware or software. In an embodiment an information handling system 100 may include an integrated circuit or a board-level product having portions thereof that may also be any combination of hardware and software. Devices, modules, resources, controllers, or programs that are in communication with one another need not be in continuous communication with each other, unless expressly specified otherwise. In addition, devices, modules, resources, controllers, or programs that are in communication with one another may communicate directly or indirectly through one or more intermediaries.

FIG. 2 is a block diagram illustrating a usage profile based CO2 optimization system communicating recommended adjustments to operating environment of a remote client information handling system according to an embodiment of the present disclosure. A unified endpoint management (UEM) platform 200 in an embodiment may execute a usage profile based CO2 optimization system 280 to minimize carbon footprints at a plurality of client information handling systems (e.g., 250 and 270) under management of or in communication with an enterprise management system 230, which may act as an interface between the client information handling system (e.g., 250 or 270) and the UEM platform 200. The UEM platform 200 in an embodiment may operate as a cloud-based service in communication with the enterprise management system 230 via a network to identify information technology (IT) issues at a first client information handling system 250, or a second client information handling system 270. The UEM platform 200 and enterprise management system 230 may also provide support for such issues, including automatically updating drivers or hardware components, as needed. In a specific embodiment of the present disclosure, the UEM platform 200 may gather telemetries from a plurality of client information handling system (e.g., 250 and 270) that describe operating environments for those client information handling systems (e.g., heat measurements, failures or errors associated with one or more hardware components, or analytics for power or software usage).

A usage profile based CO2 optimization system 280 operating at the UEM platform 200 in an embodiment may generate recommendations for adjustment of adjustable dynamic system configurations at a first client information handling system 250 for the purpose of minimizing its carbon footprint. These recommendations (e.g., for adjustments to hardware policy settings, background software application usage, update settings for firmware or software, firmware or software versions installed) may be made based upon settings for these same configurations at a second information handling system 270 having a lower carbon footprint, but similar operating capabilities as the first client information handling system 250. The usage profile based CO2 optimization system 280 in an embodiment may determine such similarity in operating capabilities by determining that the first and second client information handling systems 250 and 270 have similar user-disruptive static system configurations affecting their respective carbon footprints, which the user cannot easily adjust without replacing hardware components or compromising the user experience, as described in greater detail below with respect to FIG. 4. Adjustment of the dynamic system characteristics that can be employed by the user without replacement of hardware components or negative impact on user experience at the first client information handling system 250 to match the dynamic system characteristics at the second client information handling system 270 having a lower carbon footprint may result in lowering the carbon footprint of the first client information handling system 250 while maintaining user experience.

The usage profile based CO2 optimization system 280 in an embodiment may use a machine learning approach to classify impact of user-disruptive static system configurations on carbon footprint for each information handling systems, as described in telemetries for each of a plurality of client information handling systems. The usage profile based CO2 optimization system 280 may then group client information handling systems together into CO2 optimization classification groups based on their similarities in higher ranking user-disruptive static system configurations. It may be reasonable to expect each of the client information handling systems within a given CO2 optimization system 280 in such an embodiment to have a similar carbon footprint, since they are grouped according to similarity in user-disruptive static system configurations that are not easily changed, but are known to impact carbon footprint. Functionality of client information handling systems (e.g., 250 and 270) may be further optimized by mimicking adjustable dynamic system configurations at client information handling systems within the same CO2 optimization system 280 that have lower carbon footprint. In contrast, mimicking adjustable dynamic system configurations at client information handling systems (e.g., 250 and 270) that have lower carbon footprint but are not within the same CO2 optimization system 280 may not be feasible, or may not cause a decrease in carbon footprint. This may be the case due to the dissimilarities between the user-disruptive static system configurations of the respective client information handling systems (e.g., 250 and 270). Thus, the usage profile CO2 optimization system 280 in an embodiment avoids making recommendations based on comparisons between such mismatched client information handling systems by grouping them according to similarity of static system characteristics forming a usage profile, determined through ensemble machine-learning algorithms to impact carbon footprint at each of the client information handling systems (e.g., 250 and 270).

The UEM platform 200 may receive telemetries from a plurality of client information handling systems (e.g., 250 and 270), which may be managed by the same enterprise management system (e.g., 230), or may be managed by separate enterprise management systems in various embodiments. Each client information handling system (e.g., 250 or 270) in an embodiment may include a plurality of hardware components. For example, a first client information handling system 250 in an embodiment may include a network interface device 220, a processor (e.g., central processing unit (CPU), graphics processing unit (GPU), or visual processing unit (VPU)) 242, a monitor **245*a*, a memory 246, and one or more components of a power supply unit 245*b* (e.g., battery). In some embodiments, the first client information handling system 250 may further include one or more sensing devices, such as a fingerprint detector 243, a motion detector 247, location sensing devices 249 (e.g., GPS location unit), a temperature monitor or thermal measurement device 241, or camera 248, which may also be used during execution of videoconferencing software applications, for example. In another embodiment, the first client information handling system 250 may further be operably connected to one or more peripheral devices, such as a virtual reality headset 244, for example. Such an operably connection may employ a driver or firmware for such a peripheral device in such an embodiment. One or more of the other hardware components described herein (e.g., 220, 241, 242, 243, 244, 245*a*, 245*b*, 246, 247, 248, or 249**) may further operate according to firmware or driver instructions in an embodiment.

A power analytics module 240 in an embodiment may be in communication with various hardware components (e.g., 220, 241, 242, 243, 244, **245*a*, 245*b*, 246, 247, 248, or 249) and firmware for those components in an embodiment. For example, the power analytics module 240 may monitor power consumption by each of the various hardware components (e.g., 220, 241, 242, 243, 244, 245*a*, 245*b*, 246, 247, 248, or 249) in an embodiment, as well as thermal measurements made by the temperature monitor 241 at various locations throughout the first client information handling system 250. In another example embodiment, the power analytics module 240 may also access firmware for hardware components (e.g., 220, 241, 242, 243, 244, 245***a*, 245*b*, 246, 247, 248, or 249) to determine policies or settings for those components at the time of such power measurements.

More specifically, the power analytics module 240 in an embodiment may determine whether a network interface device 220 is transceiving according to WLAN, WWAN, Bluetooth®, or Near Field Communication (NFC) standards, as well as policies setting a preference for one type of standard over another, or restrictions on power consumption, data rate, or frequencies used by the network interface device 220. In another example, the power analytics module 240 in an embodiment may determine current usage as a percentage of total capacity for the processor 242 (e.g., central processing unit (CPU), graphics processing unit (GPU), or visual processing unit (VPU)). In still another example, the power analytics module may determine current usage as a percentage of total capacity for memory 246, time required to process requests to access such memory 246, and identify software applications most frequently accessing such memory 246. In yet another example, the power analytics module 240 in an embodiment may determine a usage mode for the monitor 245*a*, such as day mode, night mode, power reserve mode, or gaming mode (e.g., high-resolution). In still another example embodiment, the power analytics module 240 may determine policies controlling the periods in which sensing hardware may be operational. More specifically, the power analytics module 240 in an embodiment may determine whether the fingerprint detector 243, motion detector 247, location sensing device (e.g., GPS unit) 249, or camera 248 are set to remain on at all times, to operate only when a laptop or mobile information handling system is in a certain position (e.g., closed or open), to operate when a mobile device is currently moving, or to operate only when a user is actively executing software applications or certain software applications. In yet another embodiment, the power analytics module 240 may determine the media capture instructions setting for the camera 248, indicating a resolution of captured images, a frequency at which those images are captured, and any processing algorithms that may be applied to those images (e.g., zooming, cropping, background image application, boundary recognition, face recognition, smoothing, etc.). All information accessed in such a way by the power analytics module 240 in an embodiment may be communicated to a data collector 261.

The power analytics module 240 in an embodiment may also be capable of adjusting such policies within firmware for one or more hardware components, upon user approval. For example, the power analytics module 240 in an embodiment may instruct a network interface device 220 to transceive according to the Bluetooth®, rather than WLAN or WWAN, or reset policies for the network interface device 220 to restrict power consumption, data rate, or frequencies used. In another example, the power analytics module 240 in an embodiment may adjust the usage mode for the monitor 245*a* to a lower power consumption mode, such as power reserve mode, or lower resolution mode. In still another example embodiment, the power analytics module 240 may decrease the periods in which sensing hardware may be operational, such as restricting such periods to when the first client information handling system 250 is in a closed position, an idle or sleep mode, currently moving, or in startup mode. In yet another embodiment, the power analytics module 240 may adjust the media capture instructions setting for the camera 248 by decreasing a resolution of captured images or a frequency at which those images are captured, or limiting execution of any processing algorithms that may be applied to those images (e.g., zooming, cropping, background image application, boundary recognition, face recognition, smoothing, etc.).

In an embodiment, the power analytics module 240 may also be capable of determining the current versions of drivers for various hardware components (e.g., 220, 241, 242, 243, 244, 245*a*, 245*b*, 246, 247, 248, or 249). In some embodiments, the power analytics module 240 may receive updated drivers, direct installation of those drivers, or pause repeated attempts at unsuccessful driver installations in order to increase efficiency of associated hardware components (e.g., 220, 241, 242, 243, 244, 245*a*, 245*b*, 246, 247, 248, or 249). In other embodiments, the power analytics module 240 may also identify and delete obsolete or redundant files associated with previously replaced or obsolete drivers, and track power consumed during installation or updating of such drivers. In still other embodiments, the power analytics module 240 may further determine power consumed during updates made to various software applications executing via the processor 242 (e.g., CPU, GPU, or VPU).

As described above, the power analytics module 230 may be in communication with a data collector 261, which may also be in communication with an application analytics module 230. In an embodiment, the application analytics module 230 may monitor and adjust execution of software applications within the operating system (OS) for the first client information handling system 250. The application analytics module 230 in an embodiment may further track which software applications are running or idle (e.g., executing in the background) at various times, and track current versions of software applications and times at which updates to such software applications are performed. In still another example, the application analytics module 230 may determine current usage as a percentage of total capacity for memory 246, time required to process requests to access such memory 246, and identify software applications most frequently accessing such memory 246. Information gathered by the application analytics module 230 in such an embodiment may be communicated to the data collector 261.

The application analytics module 230 in an embodiment may further direct operation of certain software applications, based on user approval. For example, the application analytics module 230 in an embodiment may cap the percentage of total capacity for the processor 242 or the memory 246 that may be used by specifically identified software applications, or terminate software applications submitting repeated interrupts to the CPU 242 or GPU 246. As another example, the application analytics module 230 in an embodiment may terminate or cap the percentage of total capacity for the processor 242 or memory 246 that may be used by idle or background applications.

As described herein, the data collector module 261 in an embodiment may gather data regarding hardware configuration and power consumption from the power analytics module 240 and data regarding software performance and processor/memory usage from the application analytics module 230. In some embodiments, the data collector may also gather information from an event viewer 265 (e.g., Microsoft® Event Viewer) tracking computing events relating to software, firmware, and hardware in real-time. Such events may include notification of errors relating to various attempted processes at the first client information handling system 250. More specifically, the event viewer 265 in an embodiment may record one or more Windows Hardware Error Architecture (WHEA) events indicating a hardware error. Such WHEA events may be associated with data packets that specifically identify the hardware component (e.g., 220, 241, 242, 243, 244, 245*a*, 245*b*, 246, 247, 248, or 249) producing the error. The data collector 261 may routinely collect information from each of the power analytics module 240, the application analytics module 230 or the event viewer 265 at preset intervals, or may do so upon notification by one of these modules (e.g., 230, 240, or 265) of a specific event, failure, or warning, such as a temperature measurement from temperature monitor 241 exceeding a preset maximum temperature threshold value.

Information recorded by the event viewer 265 in an embodiment may be output in the form of a log, while information recorded by the power analytics module 240 or the application analytics module 230 may be output into reports. The format of such a log or report may vary, which may require reformatting of such information into an easily classified, sorted, and searchable format. Thus, the data collector 261 in an embodiment may operate to reformat any received logs or reports into a predetermined data interchange format such as JavaScript Object Notation (JSON), of Extensive Markup Language (XML). Specific examples described herein may use the JSON format for consistency and ease of explanation, but any other type of existing or later developed predetermined data interchange format agreed upon between data sinks and sources may be used in various embodiments.

The data collector 261 in an embodiment may transmit information received at any given time from the power analytics module 240, application analytics module 230, or event viewer 265) and reformatted to a predetermined data interchange format (e.g., JSON) based to a data classifier 262. Such a JSON-formatted report or log may be referred to herein as a JSON event. Each JSON event may include any information gathered from the power analytics module 240, application analytics module 230, or event viewer 265 and a time stamp associated with either the time the analytics module report was generated, or the time at which a WHEA (or other known convention for categorizing processing events) error occurred. In some cases, a JSON event may include a single WHEA error (e.g., processor error), or a single notification or warning from an analytics module (e.g., temperature monitor 241 recorded a temperature exceeding a preset maximum temperature threshold value). In other cases, a JSON event may include routinely gathered information such as current configurations or policies for various hardware components (e.g., 220, 241, 242, 243, 244, 245*a*, 245*b*, 246, 247, 248, or 249) or software applications, power consumption of those components over a known monitoring time period, current versions of drivers or software applications, and timestamps for installation of updates to such drivers or software applications. Such information may be illustrated by the following table:

TABLE 1

| | |
|---|---|
| Timestamp | 1655156447 |
| Client Device ID | 123456 |
| Event ID | 456789 |
| Errors, notifications, warnings | Workload on processor: 90%<br>WHEA error at processor<br>Processor end of life reached<br>Memory operating at 100 W<br>Temperature above 150 degrees Fahrenheit<br>Display Driver 14.3 Install Unsuccessful |
| Location | Austin, TX |
| Model | Laptop 5400 |

TABLE 1-continued

| | |
|---|---|
| Hardware Configuration | WLAN network interface device;<br>WWAN network interface device;<br>Bluetooth ® network interface device;<br>16 GB memory;<br>X series CPU;<br>G Series GPU;<br>256 GB Solid State Drive (SSD);<br>15.6 inch full high definition (HD) organic light emitting diode (OLED) display;<br>Display driver version 14.2<br>Virtual Reality headset peripheral;<br>Motion detector;<br>Camera;<br>Fingerprint detector; |
| Hardware Performance | WWAN Interface Device transceived 100 GB<br>Display in High Definition Mode<br>Motion Detector Set to Continuous Monitor<br>Camera in High Resolution Mode |
| Software Performance | Operating System 10.2;<br>Display Driver Install Time 97 minutes<br>Video Conference Software Application using 90% antenna;<br>Code Compiling Software Application using 90% CPU;<br>Gaming Software Application using 90% GPU; |

Some or all of the information displayed above within TABLE 1 may be formatted as a JSON incident in an embodiment. Each row of the above table may be formatted as one or more JSON events within the JSON incident in an embodiment. A JSON incident may include a data node identifying an event ID, a source for the event (e.g., power analytics module 240, applications analytics module 230, or event viewer 265), a timestamp for that event, one or more custom flags identifying the errors, notifications, or warnings, and one or more device current states, identifying the software and hardware configurations. Any one of the rows of the JSON incident illustrated directly below may represent a JSON event. For example, such a data node depicting information from TABLE 1, above, may appear in a JSON incident as:

```
{
  "data" :
  {
    "event_id" : 456789,
    "source_ID" : power_analytics_module,
    "timestamp_unixtime_ms" : 1544145336,
    "custom_flags" :
      {
        "CPU_workload_code_compiling_software_app" : 0.90,
        "WHEA_Error" : CPU,
        "Device_End_of_Life" : CPU,
        "Memory_power_consumption" : 100W
        "Temp" : 150_F,
        "Unsuccessful_driver_install_attempts" :
        display_driver_14.3,
        "Device_Driver_Call_Failure_Rate" : 0.55
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
        "Display_mode" : high_definition,
        "Camera_type" : webcam,
```

-continued

```
        "Camera_detection_mode" : continuous_monitor,
        "Camera_capture_mode" : high_resolution,
        "OS_Version" : 10.2
        "Video_Conference_App" : Active
        "Gaming_App" : Active
        "Code_Compiling_App" : Background
      }
   }
}
```

The example given above in TABLE 1 and the corresponding above JSON incident may further include any number of other errors, notifications, or warnings, hardware configurations, software performance analytics, or descriptions of policies in place for hardware or software at the client information handling system 250, as monitored by either the power analytics module 240 or the application analytics module 230. Upon reformatting of information in an embodiment, the data collector 261 may transmit the JSON incident to the data classifier 262. In an embodiment, the data classifier 262 may operate to analyze the contents of the JSON incident, to classify the type of JSON events included therewithin, and to edit the JSON incident to generate a second JSON incident that includes that classification type.

Classification types may be preset according to instructions received by the usage profile based CO2 optimization system 280 by the recommendation agent 289. Such classification types may assist the sustainability engine 281 and systems internal health assessor 283 in determining recommendations to minimize carbon footprints across a plurality of client information handling systems by adjusting adjustable dynamic system configurations, as described in greater detail below. For example, the usage profile based CO2 optimization system 280 may make recommendations based on information describing hardware workloads, software application usage, and background software application usage. Any errors associated with these areas may be integral to generating successful recommendations for minimizing carbon footprints. Thus, each of these information types may be associated with a separate preset classification type. In other embodiments, other classification types, such as software resource use, hardware configuration, or driver performance, may be preset and available for use in classifying JSON incidents received from the data collector 261.

Incident classifications in an embodiment may be associated with one or more previously identified event values. For example, an incident classification for "workload," identifying relatively high workloads that may result in various hardware component failures in an embodiment may be associated by the usage profile based CO2 optimization system 280 with JSON events titled "CPU workload code compiling software app" having a value exceeding 85%. In another example, an incident classification for "Config," identifying a hardware configuration or policy that may result in various hardware component failures in an embodiment may be associated with JSON events titled "Config," having a value such as "full_power_mode" (e.g., indicating full power supplied to the monitor), "active sensing mode" (e.g., indicating sensing hardware components set to remain on), "High_Definition_Mode" (e.g., indicating GPU or monitor set to display in high definition). In yet another example, an incident classification for "app_usage," identifying relatively intensive usage of software applications that may result in various hardware component failures in an embodiment may be associated with JSON events titled "App_usage" having a value exceeding 85%. In still another example, an incident classification for "driver performance," identifying poor or inefficient driver performance (e.g., as indicated by a percentage of calls to that driver resulting in an error over a preset time period) that may result in various hardware component failures in an embodiment may be associated with JSON events titled "driver perf" having a value exceeding 50%. In yet another example, an incident classification for "background usage," identifying relatively intensive usage of software applications operating in idle mode or in the background that may result in various hardware component failures in an embodiment may be associated with JSON events titled "background usage" having a value exceeding 85%. Any numerical or percentage maximum application usage threshold values preset as described directly above may be set to any number between one and one hundred in various embodiments described herein.

In an example embodiment, the data classifier 262 in an embodiment may analyze the JSON incident described above to identify whether any of the JSON events and values associated with preset incident classifiers appear within the JSON incident. For example, the data classifier 262 in an embodiment may determine the JSON incident described above includes the JSON event named "CPU workload," having a value of 0.90, or 90%, which is greater than the preset maximum CPU workload of 85%. The data classifier 262 in such an embodiment may further identify the JSON event named "Temp," having a value of 150_F. In some embodiments, the data classifier 262 may only apply an incident classifier for use by the usage profile based CO2 optimization system upon initial determination that a JSON event named "Temp" has a value exceeding a preset maximum internal temperature threshold (e.g., 150 degrees Fahrenheit) associated with known hardware component failures. In such an embodiment, the data classifier 262 in an embodiment may classify the JSON incident described above as "workload," indicating a high detected workload may be causing increased temperatures and decreased efficiency or functionality of one or more hardware components. The data classifier 262 in an embodiment may apply such a classification by editing the JSON incident received from the data collector 261 to generate a classified JSON incident that includes the following incident classification, in addition to the data nodes described above, within the JSON incident:

```
{
  "incident_class" : Workload
  "incident_class" : Driver_perf,
  "incident_class" : Config,
}
```

The classified JSON incident in an embodiment may be transmitted to the device index mapper 263, which may operate to associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. In some embodiments, the device index mapper 263 may also retrieve a location for the first client information handling system 250 from the location mapper 264 or the GPS unit 249. In some cases, the location mapper 264 may represent the location of the first client information handling system 250 with reference to its location within a campus of an enterprise. More specifically, the first client information handling system 250 may be located on a specific floor of a specific building. The device index mapper 263 in an embodiment may then edit the classified JSON incident to generate an indexed and classified JSON incident that includes this information, such as shown directly below, which is then transmitted to the recommendation agent 289, and then to the sustainability engine 281 of the UEM platform 200:

```
{
  "data" :
  {
    "event_id" : 456789,
    "source_ID" : power_analytics_module,
    "timestamp_unixtime_ms" : 1544145336,
    "custom_flags" :
      {
        "CPU_workload_code_compiling_software_app" : 0.90,
        "WHEA_Error" : CPU,
        "Device_End_of_Life" : CPU,
        "Memory_power_consumption" : 100W
        "Temp" : 150_F,
        "Unsuccessful_driver_install_attempts" :
        display_driver_14.3,
        "Device_Driver_Call_Failure_Rate" : 0.55
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2
        "Video_Conference_App" : Active
        "Gaming_App" : Active
        "Code_Compiling_App" : Background
      }
  }
}
  }
  "incident_class" : Workload
  "incident_class" : Driver_perf,
  "incident_class" : Config,
}
```

The usage profile based CO2 optimization system 280 operating at the UEM platform 200 in an embodiment may include a sustainability engine 281, telemetry storage 282, a systems internal health assessor 283, a reward system 284, and a CO2 optimization engine 285. The sustainability engine 281 in an embodiment may operate to routinely gather indexed and classified JSON incidents from recommendation agents (e.g., 289 and 271) operating at a plurality of information handling systems (e.g., 250, and 270, respectively). Each indexed and classified JSON incident thus received in an embodiment may be stored in telemetry 282 for later analysis by the Systems Internal Health Assessor (SIHA) 283 or the usage profile based CO2 optimization system 280. Such telemetry may also include information such as a distributed power CO2 emissions value determined at one or more client information handling systems (e.g., 250), or known statistics for GHG emissions due to power consumption in the measured location of a client information handling system (e.g., 250). In some embodiments, the JSON incidents stored in telemetry 282 may further include the distributed power CO2 emissions value, determined based on the location of the client information handling system. As described herein, carbon footprint for a client information handling system (e.g., 250 or 270) in an embodiment may be based on the power consumed by the client information handling system (e.g., 250 or 270), the duration of such consumption, and a distributed power CO2 emissions value describing the amount of CO2 or other GHGs emitted during generation of each Watt of power consumed by the client information handling system (e.g., 250 or 270). In other embodiments, the CO2 optimization engine 285 may determine such a distributed power CO2 emissions value for each of a plurality of client information handling systems (e.g., 250 and 270) based on the location given within a JSON incident (e.g., as shown directly above) and stored in telemetry 282. The sustainability engine 281 in an embodiment may also determine and store in telemetry 282 a carbon footprint for each of the client information handling systems (e.g., 250 or 270) for which telemetry has been received using the power consumed by the client information handling system (e.g., 250 or 270) recorded in telemetry, the duration of such consumption, and a distributed power CO2 emissions value retrieved from the CO2 optimization engine 285.

The SIHA 283 in an embodiment may search telemetry 282 data to identify indications within the indexed and classified JSON incidents of hardware failures, errors, or underperformance at reporting client information handling systems (e.g., 250 or 270). For example, the SIHA 283 in an embodiment may search the indexed and classified JSON incident described above, which has been transmitted to the sustainability engine 281 and stored in telemetry 282 to identify the JSON event named "WHEA_Error," having a value CPU, indicating an error at the CPU. As described above, any of a number of WHEA or other conventionally recorded errors may appear within indexed and classified JSON incidents and may identify any of the hardware components (e.g., 220, 241, 242, 243, 244, 245*a*, 245*b*, 246, 247, 248, or 249) operating at the client information handling system 250 in an embodiment. Upon identification of such an error associated with an identified hardware component, the SIHA 283 may transmit a notification to the sustainability engine 281 that the indexed and classified JSON incident (e.g., identified by event_id given within the indexed and classified JSON incident) indicates poor health of a hardware component.

In another aspect, the telemetry 282 may also include results of benchmark testing performed at the power analytics modules (e.g., 240) of each of a plurality of information handling systems (e.g., 250 and 270) transmitting analytics and event logs to the UEM platform 200, in an embodiment. As described herein, the power analytics module 240 may test the performance of one or more hardware components by executing sample tasks similar to tasks performed by those devices routinely. The power analytics module 240 may assign a test benchmark score for each tested hardware component (e.g., 246), based on the speed and accuracy with which each component completes these basic tasks.

The systems internal health assessor (SIHA) 283 in an embodiment may search telemetry 282 data to identify indications within received application analytics, power analytics, or event viewer logs translated into JSON incidents of hardware failures, errors, or underperformance at reporting client information handling systems (e.g., 250 or 270). In other embodiments, the SIHA 283 may determine that a component is failing if one or more JSON incidents for the information handling system (e.g., 250) using that hardware component (e.g., 246) include a number of errors for that component (e.g., 246) that meets or exceeds a maximum error threshold (e.g., 100, 50, 10, 5) within a preset period of time (e.g., 24 hours). These are only example maximum error threshold values and preset time period values, and any values for these thresholds are contemplated herein.

As another example, the SIHA 283 may determine that a component is failing if one or more JSON incidents for the information handling system (e.g., 250) indicate a test benchmark score for that component (e.g., 246) that falls below a preset minimum benchmark threshold value (e.g., 85% of average crowd-sourced benchmark value). As described above, the telemetry 282 may store results of benchmark testing performed at the power analytics modules (e.g., 240) of each of a plurality of information handling systems (e.g., 250 and 270) testing the performance of one or more hardware components by executing sample tasks similar to tasks performed by those devices routinely. For each hardware component type (e.g., CPU, GPU, memory, network interface device, etc.), the SIHA 283 in an embodiment may determine the average test benchmark value across a plurality of information handling systems (e.g., 250 and 270), against which test benchmark values for individual components (e.g., 242, 246, 220) may be compared in order to determine whether such an individual component is underperforming or failing. For example, the SIHA 283 may determine that the memory 246 of the first information handling system 250 is failing in an embodiment in which the test benchmark score for that memory 246, as indicated within power analytics or application analytics stored in telemetry 282 is less than a preset minimum percentage of the average test benchmark score (e.g., 85%) for all similar memory devices (e.g., computer hard drives) in the plurality of other information handling systems (e.g., including 270) reporting to the UEM platform 200. This preset minimum percentage is just an example, and other values are contemplated. Further, preset minimum percentage may be defined on a component by component basis. In other words, the preset minimum percentage for determining whether a memory is failing may be 85%, while the preset minimum percentage for determining whether a processor is failing may be 90%, for example.

The usage profile based CO2 optimization system 280 in an embodiment may operate to classify a plurality of client information handling systems (e.g., 250 and 270) into groups that are likely to have similar carbon footprints based on user-disruptive static system configurations. Each of these user-disruptive static system configurations in an embodiment may include configurations or usage that cannot be adjusted by a user of the client information handling systems (e.g., 250 or 270) without replacement of hardware components (e.g., 220, 241, 241, 243, 244, 245*a*, 245*b*, 246, 247, 248, or 249) or negative impacts on the user experience. For example, the type of hardware components of which a user's client information handling system (e.g., 250 or 270) is comprised, such as processors 242, memory 246, network interface devices 220, or display 245*a* may not be altered without replacing these hardware components with another type. More specifically, a graphics processing unit (GPU) (e.g., 242) that has been designed and manufactured for streaming digital content may not be altered by a user into a GPU designed and manufactured for online gaming software applications. Similarly, a user cannot change the fact that the CPU 242 has reached the end of its estimated life cycle without replacing the CPU 242. As another example, the usage of certain software applications or location at which the client information handling system (e.g., 250) is used may not be altered by a user without negatively impacting user experience. Frequently, a user purchases a client information handling system (e.g., 250 or 270) specifically to handle execution of the type and number of software applications the user wishes to execute. Similarly, the user usually intends to use the client information handling system (e.g., 250 or 270) in a specific geographic location (e.g., city, state, region) upon purchase of the client information handling system (e.g., 250 or 270). Thus, a user may not be likely to accept a recommendation to change software usage or location. Consequently, each of these characteristics (e.g., hardware type, hardware health, elevated software application usage levels, location of use) may form user-disruptive static system configurations. All user-disruptive static system configurations for a given client information handling system (e.g., 250 or 270) may be combined to form a usage profile for that client information handling system (e.g., 250 or 270) in an embodiment. Further, each of these static system configurations may also impact the carbon footprint for each of the client information handling systems in an embodiment, as described in greater detail below with respect to FIG. 4.

Each of these usage profiles combining all of the user-disruptive static system configurations described above may form the input into one or more ensemble machine learning algorithms for the usage profile based CO2 optimization system 280 in an embodiment. The usage profile based CO2 optimization system 280 may retrieve each of these user-disruptive static system configurations or usage profiles from telemetry 282. The usage profile based CO2 optimization system 280 in an embodiment may use one or more ensemble machine-learning methods, such as Bootstrap Aggregating (bagging), stacking, or boosting methods to rank the impact on carbon footprint of each of the various user-disruptive static system configurations within each usage profile for each of the plurality of client information handling systems (e.g., 250 or 270), as described in greater detail below with respect to FIG. 4. Each of these ensemble machine-learning algorithms in an embodiment may provide a ranking of user-disruptive static system configurations from most likely to impact carbon footprint of a client information handling system, to least likely to impact such a carbon footprint. These rankings also may correlate to similarity of user-disruptive static system configurations as among client information handling systems.

The usage profile based CO2 optimization system 280 in an embodiment may group each of the client information handling systems (e.g., 250 and 270) together into CO2 optimization classifications based on the machine-learning rankings for user-disruptive static system configurations and telemetry values for user-disruptive static system configurations for each of the plurality of client information handling systems (e.g., 250 and 270). By grouping client information handling systems according to similarity of higher ranking user-disruptive static system configurations, the usage profile based CO2 optimization system 280 in an embodiment may provide an indication of which client information handling systems (e.g., 250 or 270) may reasonably be expected to have similar carbon footprints based on similarity of specific (higher ranking) usage profile user-disruptive static system configurations.

Carbon footprints at some client information handling systems in each group may be decreased by mimicking various adjustable dynamic system configurations (e.g., hardware, software, and firmware usage and configurations) at client information handling systems within the same group that have a lower carbon footprint in comparison. For example, in an embodiment in which the first client information handling system 250 and second client information handling system 270 are placed in the same CO2 optimization classification group, and the second client information handling system 270 has a lower carbon footprint than the first client information handling system 250, the usage profile based CO2 optimization system 280 may recommend that the first client information handling system 250 adjust one or more adjustable dynamic system configurations to match those of the second client information handling system 270 in order to minimize the carbon footprint of the first client information handling system 250. More specifically, and as described in greater detail below with respect to FIG. 5, the usage profile based CO2 optimization system 280 in an embodiment may recommend adjustment to adjustable dynamic system configurations at the first or second client information handling systems (e.g., 250 or 270) such as hardware policy settings, background software application usage, software or firmware update settings, or firmware versions installed. These are only a few examples of adjustable dynamic system configurations in an embodiment. Other embodiments contemplates any setting, policy, usage measurement, or software or firmware version that may be adjusted by the user without replacement of a hardware component or negative impact on the user experience.

In an example embodiment, the usage profile based CO2 optimization system 280 may determine that the second client information handling system 270, having a lower carbon footprint than the first client information handling system 250 has its display set to standard resolution or low power consumption mode, while the first client information handling system 250 has its display *245a* set to a high definition mode. In such a scenario, the usage profile based CO2 optimization system 280 may recommend that the first client information handling system 250 set its display *245a* to the standard resolution or low power consumption mode matching the setting for the display at the second client information handling system 270.

In another example embodiment, the usage profile based CO2 optimization system 280 may determine that the second client information handling system 270, having a lower carbon footprint than the first client information handling system 250 limits the number of hardware component resources that may be used by a background software application, while the first client information handling system 250 allows its background software applications to run continuously. In such a scenario, the usage profile based CO2 optimization system 280 may recommend that the first client information handling system 250 limit the hardware component resources available for execution of background software applications, matching the setting for at the second client information handling system 270.

In still another example embodiment, the usage profile based CO2 optimization system 280 may determine that the second client information handling system 270, having a lower carbon footprint than the first client information handling system 250 limits the number of hardware component resources that may be used during installation of software or firmware updates, or the frequency of such updates, while the first client information handling system 250 auto-updates all of its software and firmware without restriction. In such a scenario, the usage profile based CO2 optimization system 280 may recommend that the first client information handling system 250 limit the hardware component resources available for installation of updates, or cancellation of auto-updates, matching the setting for at the second client information handling system 270.

In still another example embodiment, the usage profile based CO2 optimization system 280 may determine that the second client information handling system 270, having a lower carbon footprint than the first client information handling system 250 has a newer version of firmware or software installed than the first client information handling system 250. In such a scenario, the usage profile based CO2 optimization system 280 may recommend that the first client information handling system 250 update the identified version to the latest available version.

The usage profile based CO2 optimization system 280 in an embodiment may transmit these recommendations to the first client information handling system 250 in such embodiments. At the first client information handling system 250, the recommendation agent 289 may receive these recommendations and display them for user adoption via the GUI 290. For example, the GUI 290 may display a recommendation that the user set the display *245a* to the standard resolution or low power consumption mode, and provide instructions for how to do so. As another example, the GUI 290 may display a recommendation that the user limit the hardware component resources available for execution of background software applications, and provide instructions for how to do so. In yet another example, the GUI 290 may display a recommendation that the user limit the hardware component resources available for installation of updates, or cancellation of auto-updates, and provide instructions for how to do so. In still another example embodiment, the GUI 290 may display a recommendation that the user update an identified version of software or firmware to the latest available version, and provide instructions on how to do so. The user may have the option to accept or reject any of these recommendations. Each of these recommendations in an embodiment may be employed by the user to decrease the carbon footprint for the first client information handling system 250 toward the lower carbon footprint for the second client information handling system 270 by mimicking adjustable dynamic system configurations at both client information handling systems 250 and 270 that may be minimizing the carbon footprint at the second client information handling system 270. In such a way, the usage profile based CO2 optimization system 280 may recommend hardware, software, or firmware usage or configuration adjustments to minimize carbon footprint across a plurality of client information handling systems based on optimal configurations at comparable client information handling systems.

FIG. 3 is a flow diagram illustrating a method of transmitting telemetry data describing an operating environment of a client information handling system and receiving recommendations for adjustment of the operating environment according to an embodiment of the present disclosure. As described herein, the usage profile based CO2 optimization system in an embodiment may recommend changes to hardware, software, firmware, and update configurations and settings to optimize the carbon footprint across a plurality of client information handling systems. These recommendations may be based, in various embodiments described herein, on crowd-sourced telemetry data for a plurality of client information handling systems maintained by the same enterprise system. FIG. 3 may describe collection of telemetry data across a large pool of client information handling systems necessary to make such determined recommendations.

At block 302, a data collector of a client information handling system in an embodiment may gather event log data, or reports from analytics engines such as hardware analytics applications or software analytics applications, and translate these logs or reports into a predetermined data interchange format such as JavaScript Object Notation (JSON), Extensive Markup Language (XML), or Yet Another Markup Language (YAML). Any format may be used, but JSON is discussed herein by way of an example embodiment. For example, in an embodiment described with reference to FIG. 2, above, the data collector 261 may gather reports from the power analytics module 240 and the application analytics module 230 and event logs from the event viewer 265. The data collector 261 in such an embodiment may further translate these reports and logs into JSON incidents for later parsing, searching, and editing by various components of the first client information handling system 250 and the usage profile based CO2 optimization system 280. For example, the data collector 261 may generate the following JSON incident based on the information gathered and stored in Table 1, above:

```
{
  "data" :
  {
    "event_id" : 456789,
    "source_ID" : power_analytics_module,
    "timestamp_unixtime_ms" : 1544145336,
    "custom_flags" :
      {
        "CPU_workload_code_compiling_software_app" : 0.90,
        "WHEA_Error" : CPU,
        "Device_End_of_Life" : CPU,
        "Memory_power_consumption" : 100W
        "Temp" : 150_F,
        "Unsuccessful_driver_install_attempts" :
        display_driver_14.3,
        "Device_Driver_Call_Failure_Rate" : 0.55
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2
        "Video_Conference_App" : Active
        "Gaming_App" : Active
        "Code_Compiling_App" : Background
      }
  }
```

The data classifier in an embodiment may classify objects within the gathered JSON event with preset incident types describing hardware configuration (e.g., CPU type, GPU type, display type, model), heat measurements, hardware component failures, or software application execution and usage (e.g., CPU resource usage by code compiling software at 90%), for the client information handling system at the time of the event at block 304. For example, the data classifier 262 in an embodiment may edit the JSON incident created at block 302 by adding an incident classifier. More specifically, the data classifier 262 in an embodiment may analyze the JSON incident generated at block 302 to identify whether any of the JSON events and values associated with preset incident classifiers appear within the JSON incident. For example, the data classifier 262 in an embodiment may determine the JSON incident described above includes the JSON event named "CPU workload," having a value of 0.90, or 90%, which is greater than the preset maximum CPU workload of 85%. In such an embodiment, the data classifier 262 in an embodiment may classify the JSON incident described above as "workload," indicating a high detected workload may be causing increased temperatures and decreased efficiency or functionality of one or more hardware components. The data classifier 262 in an embodiment may apply such a classification by editing the JSON incident received from the data collector 261 to generate a classified JSON incident:

```
{
  "data" :
  {
    "event_id" : 456789,
    "source_ID" : power_analytics_module,
    "timestamp_unixtime_ms" : 1544145336,
    "custom_flags" :
      {
        "CPU_workload_code_compiling_software_app" : 0.90,
        "WHEA_Error" : CPU,
        "Device_End_of_Life" : CPU,
        "Memory_power_consumption" : 100W
        "Temp" : 150_F,
        "Unsuccessful_driver_install_attempts" :
        display_driver_14.3,
        "Device_Driver_Call_Failure_Rate" : 0.55
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2
        "Video_Conference_App" : Active
        "Gaming_App" : Active
        "Code_Compiling_App" : Background
      }
  }
}
  }
  "incident_class" : Workload
  "incident_class" : Driver_perf,
  "incident_class" : Config,
}
```

In other embodiments, the classified JSON incident may reference other incident classifications. For example, the classified JSON incident may reference an incident classification for "Config," identifying a hardware configuration or policy that may result in various hardware component failures. The classification JSON event name "Config" in such an embodiment may have a value such as "full_power_mode" (e.g., indicating full power supplied to the monitor), "active sensing mode" (e.g., indicating sensing hardware components set to remain on), "High_Definition_Mode" (e.g., indicating GPU or monitor set to display in high definition). In another example, the classified JSON incident may reference an incident classification for "app_usage," identifying relatively intensive usage of software applications that may result in various hardware component failures in an embodiment. The classification JSON event name "app_usage" in such an embodiment may have a value exceeding 85%. In still another example, the classified JSON incident may reference an incident classification for "driver performance," identifying poor or inefficient driver performance (e.g., as indicated by a percentage of calls to that driver resulting in an error over a preset time period) that may result in various hardware component failures in an embodiment. The classification JSON event name "driver performance" in such an embodiment may have a value exceeding 50%. In yet another example, the classified JSON incident may reference an incident classification for "background usage," identifying relatively intensive usage of software applications operating in idle mode or in the background that may result in various hardware component failures in an embodiment. The classification JSON event name "background usage" in such an embodiment may have a value exceeding 85%.

At block 306, a location mapper of the client information handling system may determine a geographic location or location within an enterprise campus for the client information handling system and transmit the location to the device index mapper in an embodiment. For example, the device index mapper 263 may retrieve a location for the first client information handling system 250 from the location mapper 264 or the GPS unit 249. In some cases, the location mapper 264 may represent the location of the first client information handling system 250 with reference to its location within a campus of an enterprise. More specifically, the first client information handling system 250 may be located on a specific floor of a specific building.

The device index mapper in an embodiment may generate a JSON incident including one or more JSON events and classified incident types at block 308. For example, the device index mapper 263 in an embodiment may associate the classified JSON incident with a device ID and device model for the first client information handling system 250. Such a device ID in an embodiment may be one of several device IDs for a plurality of information handling systems (e.g., including the first and second client information handling systems 250 and 270) stored at the UEM platform 200. The device index mapper 263 in an embodiment may then edit the classified JSON incident to generate an indexed and classified JSON incident that includes this information:

```
{
  "data" :
  {
    "client_device_ID" : 123456,
    "client_device_model" : Laptop_5400,
    "event_id" : 456789,
    "source_ID" : power_analytics_module,
    "timestamp_unixtime_ms" : 1544145336,
    "location" : Austin_Texas,
    "custom_flags" :
      {
        "CPU_workload_code_compiling_software_app" : 0.90,
        "WHEA_Error" : CPU,
        "Device_End_of_Life" : CPU,
        "Memory_power_consumption" : 100W
        "Temp" : 150_F,
```

-continued

```
        "Unsuccessful_driver_install_attempts" :
        display_driver_14.3,
        "Device_Driver_Call_Failure_Rate" : 0.55
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2
        "Video_Conference_App" : Active
        "Gaming_App" : Active
        "Code_Compiling_App" : Background
      }
    }
}
  }
  "incident_class" : Workload
  "incident_class" : Driver_perf,
  "incident_class" : Config,
}
```

At block 310, a recommendation agent of the client information handling system may transmit the JSON incident generated at block 308 to a remote sustainability engine of the usage profile based CO2 optimization system in an embodiment. For example, the recommendation agent 289 of the first client information handling system 250 in an embodiment described with reference to FIG. 2 may transmit the above indexed and classified JSON incident to the sustainability engine 281 operating at the UEM platform 200. As described in an embodiment with reference to FIG. 1, the usage profile based CO2 optimization system 280 may operate within the UEM platform that gathers telemetries from a plurality of client information handling system endpoints 250, 270 via a network, that describe operating environments for those client information handling systems (e.g., 250, 270). The UEM platform in an embodiment may operate as a cloud-based service to store data (e.g., operating environment telemetries for remote client information handling systems 150) within memory 102, static memory 103, or computer readable medium 186 received via network 170.

The recommendation agent at the client information handling system in an embodiment may receive a recommendation for adjustment to adjustable dynamic system configurations at the client information handling system at block 312. For example, the usage profile based CO2 optimization system 280 in an embodiment may transmit to the first client information handling system 250 the recommendations designed to mimic adjustable dynamic system configurations of another client information handling system having a lower carbon footprint, as described in greater detail below with respect to FIG. 5. At the first client information handling system 250, the recommendation agent 289 may receive these recommendations and display them for user adoption via the GUI 290.

At block 314, the recommendation agent may display the recommended changes to adjustable dynamic system configurations to the user, via a graphical user interface (GUI) in an embodiment. For example, the GUI 290 may display a recommendation that the user set the display 245*a* to the standard resolution or low power consumption mode, and provide instructions for how to do so. As another example, the GUI 290 may display a recommendation that the user limit the hardware component resources available for execution of background software applications, and provide instructions for how to do so. In yet another example, the GUI 290 may display a recommendation that the user limit the hardware component resources available for installation of updates, or cancellation of auto-updates, and provide instructions for how to do so. In still another example embodiment, the GUI 290 may display a recommendation that the user update an identified version of software or firmware to the latest available version, and provide instructions on how to do so. The user may have the option to accept or reject any of these recommendations. Each of these recommendations in an embodiment may be employed by the user to decrease the carbon footprint for the first client information handling system 250 toward the lower carbon footprint for the second client information handling system 270 by mimicking adjustable dynamic system configurations at both client information handling systems 250 and 270 that may be minimizing the carbon footprint at the second client information handling system 270.

In such a way, the usage profile based CO2 optimization system 280 may recommend hardware, software, or firmware usage or configuration adjustments to minimize carbon footprint across a plurality of client information handling systems based on optimal configurations at comparable client information handling systems. The method for transmitting telemetry data describing an operating environment of a client information handling system and receiving recommendations for adjustment of the operating environment may then end.

Figure 4:
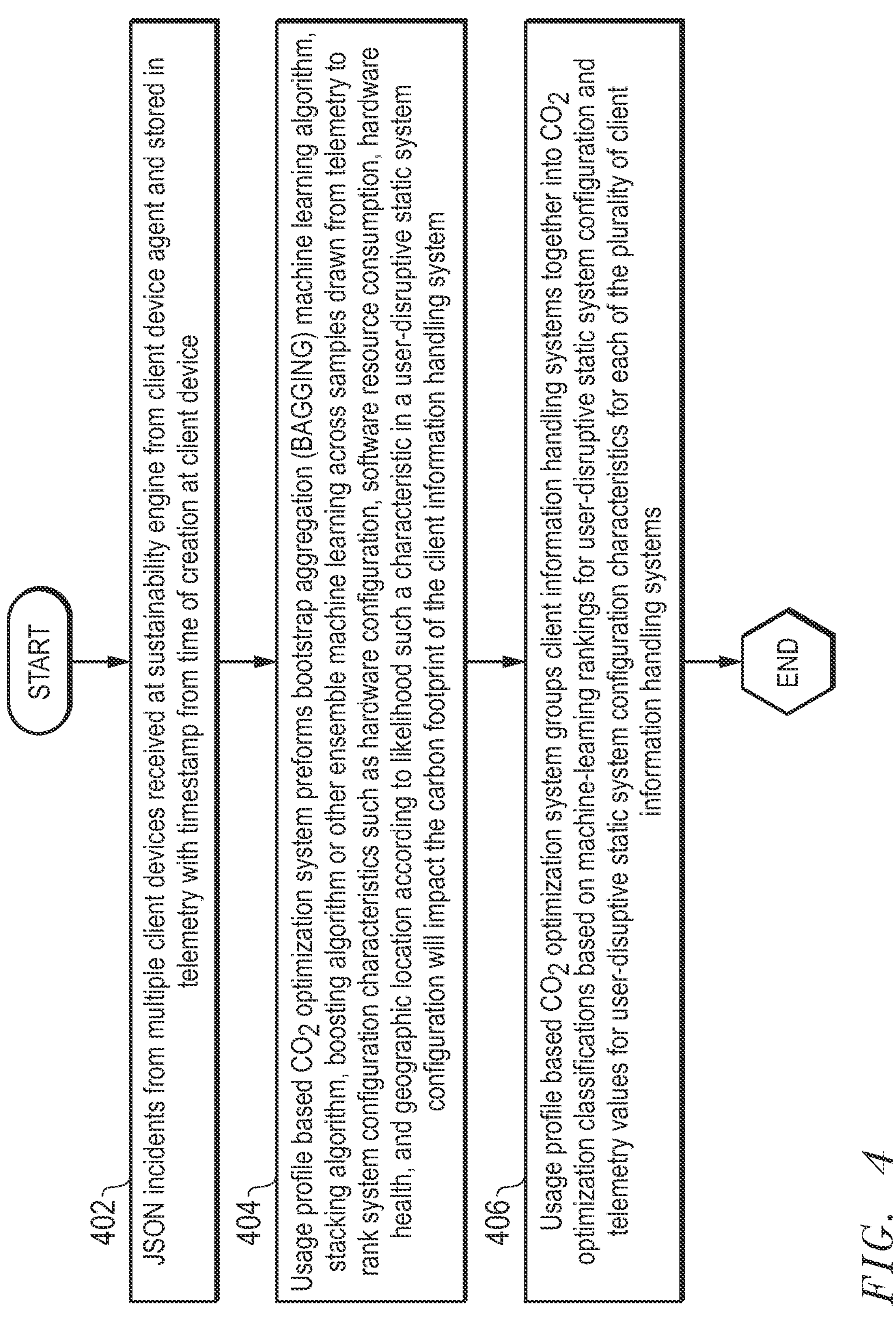
FIG. 4 is a flow diagram illustrating a method of grouping a plurality of client information handling systems into CO2 optimization classifications according to an embodiment of the present disclosure.

FIG. 4 is a flow diagram illustrating a method of grouping a plurality of client information handling systems into CO2 optimization classifications based on usage profiles for streamlining CO2 optimizing recommendations according to an embodiment of the present disclosure. As described herein, the usage profile based CO2 optimization system in an embodiment may determine recommendations to adjust software application usage (e.g., by limiting access to resources of given hardware components), hardware policy settings, and firmware versions and update settings at client information handling systems in order to minimize CO2 footprints of each of the plurality of client information handling systems. The usage profile based CO2 optimization system in an embodiment may base these recommendations on configurations and settings at other client information handling systems having similar usage profiles and lower carbon footprints. FIG. 4 may describe grouping of client information handling systems according to similarity of hardware configuration, software resource consumption, hardware health and geographic location. Each of these factors may impact a carbon footprint of a client information handling system, but may not be adjustable by the user without replacement of hardware components or disruption to user experience. As such, these factors may be referred to herein as user-disruptive static system configurations. After grouping client information handling systems according to these user-disruptive static system configurations, the usage profile based CO2 optimization system in an embodiment may identify one or more other characteristics of various client information handling systems in each classification that may be adjustable to decrease or optimize the CO2 footprint at each of the plurality of client information handling systems. These adjustable characteristics in an embodiment may be referred to herein as adjustable dynamic system configurations.

At block 402, a first JSON incident may be received at a sustainability engine from a client information handling device recommendation agent and stored in telemetry with a timestamp from the time of creation at the client information handling system in an embodiment. JSON is an example format of a markup language. It is contemplated that any format may be used in other embodiments, including XML and YAML. For example, as described above at blocks 308 and 310 of FIG. 3, and referencing an embodiment described above with respect to FIG. 2, the recommendation agent 289 operating at a first client information handling system 250 may transmit the following indexed and classified JSON incident to the sustainability engine 281 operating at the usage profile based CO2 optimization system 280:

```
{
  "data" :
  {
    "client_device_ID" : 123456,
    "client_device_model" : Laptop_5400,
    "event_id" : 456789,
    "source_ID" : power_analytics_module,
    "timestamp_unixtime_ms" : 1544145336,
    "location" : Austin_Texas,
    "custom_flags" :
      {
        "CPU_workload_code_compiling_software_app" : 0.90,
        "WHEA_Error" : CPU,
        "Device_End_of_Life" : CPU,
        "Memory_power_consumption" : 100W
        "Temp" : 150_F,
        "Unsuccessful_driver_install_attempts" :
        display_driver_14.3,
        "Device_Driver_Call_Failure_Rate" : 0.55
      }
    "device_current_state :
      {
        "NID_1_type" : WLAN,
        "NID_2_type" : WWAN,
        "NID_2_data_transceived" : 100 GB,
        "NID_3_type" : BT,
        "memory_type" : 16_GB,
        "CPU_type" : X_Series,
        "GPU_type" : G_Series,
        "SSD_type" : 256_GB,
        "Display_type" : 15.6_HD_OLED,
        "Display_driver_version" : 14.2,
        "Display_mode" : high_definition,
        "Camera_type" : webcam,
        "Camera_detection_mode" : continuous_monitor,
        "Camera_capture_mode" : high_resolution,
        "OS_Version" : 10.2
        "Video_Conference_App" : Active
        "Gaming_App" : Active
        "Code_Compiling_App" : Background
      }
    }
}
  }
  "incident_class" : Workload
  "incident_class" : Driver_perf,
  "incident_class" : Config,
}
```

As shown in the JSON incident directly above, the JSON incidents stored in telemetry 282 in an embodiment may describe the types of various hardware components (e.g., network interface device (NID), CPU, GPU, memory, etc.), hardware component resource consumption by one or more software applications (e.g., code compiling software application using 90% of CPU resources), power consumption of various hardware components (e.g., memory using 100 W), or hardware failure indicators (e.g., WHEA errors). In some embodiments, the usage profile based CO2 optimization system in an embodiment may also receive notifications from a systems internal health assessor (SIHA) 283 of hardware failure. For example, the SIHA 283 in an embodiment may notify the usage profile based CO2 optimization system 280 when telemetry 282 data for a client information handling system indicates hardware failures, errors, or underperformance at reporting client information handling systems (e.g., 250 or 270). In another example, the systems internal health assessor (SIHA) 283 in an embodiment may notify the usage profile based CO2 optimization system when telemetry 282 data for a client information handling system indicates a number of errors for a given component (e.g., 246) that meets or exceeds a maximum error threshold (e.g., 100, 50, 10, 5) within a preset period of time (e.g., 24 hours). In another example, for each hardware component type (e.g., CPU, GPU, memory, network interface device, etc.), the SIHA 283 in an embodiment may notify the usage profile based CO2 optimization system when telemetry 282 data for a client information handling system indicates when test benchmark values for individual components (e.g., 242, 246, 220) of a client information handling system fail to meet a minimum or average test benchmark value across a plurality of information handling systems (e.g., 250 and 270).

In some embodiments, the JSON incidents stored in telemetry 282 may further include a distributed power CO2 emissions value, determined based on the location of the client information handling system. As described herein, carbon footprint for a client information handling system in an embodiment may be based on the power consumed by the client information handling system, the duration of such consumption, and a distributed power CO2 emissions value describing the amount of CO2 or other GHGs emitted during generation of each Watt of power consumed by the client information handling system. In other embodiments, the CO2 optimization engine 285 may determine such a distributed power CO2 emissions value for each of a plurality of client information handling systems (e.g., 250 and 270) based on the location given within a JSON incident (e.g., as shown directly above) and stored in telemetry 282. The usage profile based CO2 optimization system in an embodiment may also determine and store in telemetry a carbon footprint for each of the client information handling systems for which telemetry has been received using the power consumed by the client information handling system recorded in telemetry, the duration of such consumption, and a distributed power CO2 emissions value.

The usage profile based CO2 optimization system in an embodiment at block 404 may perform one or more ensemble machine learning methods on the telemetry received at block 402 to classify a plurality of client information handling systems based on user-disruptive static system configurations at each of these client information handling systems that may impact CO2 footprints. Each of these user-disruptive static system configurations in an embodiment may include configurations or usage that cannot be adjusted by a user of the client information handling systems without replacement of hardware components or negative impacts on the user experience. For example, the type of hardware components of which a user's client information handling system is comprised, such as processors, memory, network interface devices, or display may not be altered without replacing these hardware components with another type. More specifically, a graphics processing unit (GPU) that has been designed and manufactured for streaming digital content may not be altered by a user into a GPU designed and manufactured for online gaming software applications. Similarly, a user cannot change the fact that the CPU has reached the end of its estimated life cycle without replacing the CPU. As another example, the usage of certain software applications or location at which the client information handling system is used may not be altered by a user without negatively impacting user experience. Frequently, a user purchases a client information handling system specifically to handle execution of the type and number of software applications the user wishes to execute. Similarly, the user usually intends to use the client information handling system in a specific geographic location (e.g., city, state, region) upon purchase of the client information handling system. Thus, a user may not be likely to accept a recommendation to change software usage or location. Consequently, each of these characteristics (e.g., hardware type, hardware health, software application usage, location of use) may form user-disruptive static system configurations.

Each of these user-disruptive static system configurations may also impact the carbon footprint for each of the client information handling systems in an embodiment. For example, variety in the type of a specific hardware component or the health of a component (e.g., efficiency) may impact power consumption, which may directly impact carbon footprint. More specifically, liquid crystal displays (LCDs) are known to consume, on average, more power than organic light emitting diode (OLED) displays. Thus, it may be more reasonable to expect client information handling systems with the same type of display to be capable of achieving similar carbon footprints (which may be heavily dependent upon power consumption) than to expect client information handling systems with different types of displays (e.g., LCD or OLED) to achieve similar carbon footprints. In other words, recommendations to change various operational aspects of a first client information handling system operating an LCD that do not include adjustments to the power consumed by the LCD may not effectively reduce the carbon footprint, since they do not take into account the large power draw by the LCD.

As another example, usage of software applications may impact power consumption at each client information handling system due to usage of hardware components drawing power. For example, each software application in an embodiment may consume a portion of resources for several hardware components of the client information handling system. More specifically, a software application may be using 90% of processing resources and 35% of memory. In such a scenario, the software application may be responsible for 90% of the processor's power consumption and 35% of the memory's power consumption. Because these power consumption values directly impact the carbon footprint for the client information handling system, the amount of time the user executes these software applications and the amount of hardware component resources consumed during such execution also directly impact the carbon footprint for the client information handling system. Again, because adjustment to the usage of these software applications may negatively impact user experience, these software application usage characteristics may form user-disruptive static system configurations.

As yet another example, location at which the client information handling system draws power may directly impact the carbon footprint for the client information handling system. The carbon footprint for a client information handling system in an embodiment may be based on the power consumed by the client information handling system, the duration of such consumption, and a distributed power CO2 emissions value describing the amount of CO2 or other GHGs emitted during generation of each Watt of power consumed by the client information handling system. As described herein, the distributed power CO2 emissions value in an embodiment may describe the amount of CO2 or other GHGs emitted during generation of each Watt of power at a specific power plant providing power to all devices within an area including the geographic location of a client information handling system (e.g., 250 or 270). The amount of GHG emitted per Watt of power may differ widely across such power plants, based on the method of power production (e.g., solar power vs. coal-burning plant). Thus, the distributed power CO2 emissions value (e.g., in CO2 pounds per Watt) and the resulting carbon footprint for the client information handling system may vary markedly between geographic locations.

These are only a few examples of user-disruptive static system configurations for a client information handling system that may not be easily adjustable by a user (e.g., without assistance from IT), or for which a recommended adjustment may be rejected by the user. Other embodiments contemplate that any characteristic of a client information handling system's operational environment that a user is not likely to willingly adjust in order to decrease a carbon footprint may be considered a user-disruptive static system configuration and form the basis of classification of a plurality of client information handling systems. These user-disruptive static system configurations may be combined to define a usage profile for each of the plurality of client information handling systems in various embodiments described herein. For example, a usage profile for a first client information handling system in an embodiment may include identification of the type of processor, amount of hardware resources consumed during execution of a specific software application (e.g., gaming application), low efficiency of an aging GPU, and location in Austin, Texas.

Each of these usage profiles combining all of the user-disruptive static system configurations described directly above may form the input into one or more ensemble machine learning algorithms for the usage profile based CO2 optimization system in an embodiment. In an example embodiment described with reference to FIG. 2, the usage profile based CO2 optimization system 280 may retrieve each of these user-disruptive static system configurations or usage profiles from telemetry 282, following storage described with reference to block 402 above. The usage profile based CO2 optimization system 280 in an embodiment may use one or more ensemble machine-learning methods, such as Bootstrap Aggregating (bagging), stacking, or boosting methods to rank the impact on carbon footprint of each of the various user-disruptive static system configurations within each usage profile for each of the plurality of client information handling systems. In other words, these methods may be used to determine whether the type of display (e.g., LCD or OLED) in a client information handling system is more or less likely to impact the carbon footprint for a client information handling system than each of the other user-disruptive static system configurations identified in the usage profile, such as the location of the client information handling system or the hardware resource consumption for a specific software application.

In a first example embodiment, the usage profile based CO2 optimization system 280 may employ a bagging algorithm to rank the impact of various user-disruptive static system configurations within the usage profile on the carbon footprint for a client information handling system. In such an example embodiment, the usage profile based CO2 optimization system 280 may input carbon footprint and each of the user-disruptive static system configurations within the usage profile (e.g., hardware type for a plurality of components, software application usage details, hardware efficiency measurements, location) for a plurality of client information handling systems into a bagging algorithm that combines a plurality of partial rankings into a single model ranking the impact of each of these user-disruptive static system configurations on carbon footprint for each of a plurality of client information handling systems.

The bagging algorithm in an embodiment may compare various usage profile characteristics for a subset of client information handling systems having similar carbon footprints (e.g., within 1%, 5%, or 10% of one another). For example, for all client information handling systems falling within a first carbon footprint grouping (e.g., all client information handling systems having a carbon footprint between 1 and 1.1 pounds of CO2 emitted per day, the bagging algorithm may determine a number of those client information handling systems that share the same type of each of a plurality of hardware components (e.g., CPU, GPU, memory, display). As another example, within that same group of client information handling systems in the first carbon footprint grouping, the bagging algorithm may determine a number of those client information handling systems that indicate the same level of hardware resource consumption by given software applications (e.g., code compiling software, gaming applications, videoconferencing applications). As yet another example, within that same group of client information handling systems in the first carbon footprint grouping, the bagging algorithm may determine a number of those client information handling systems for which the sustainability engine 281 has received notifications of poor hardware component health from the SIHA 283. In still another example, within that same group of client information handling systems in the first carbon footprint grouping, the bagging algorithm may determine a number of those client information handling systems that have the same distributed power CO2 emissions value.

The bagging algorithm may then rank each of these user profile characteristics according to the frequency with which client information handling systems within the first carbon footprint grouping display the same values. For example, 42 client information handling systems within the first carbon footprint grouping in an embodiment may share the same GPU, 37 may use more than 80% of CPU resources during execution of a videoconferencing application, 46 may have the same distributed power CO2 emissions value (or fall within a preset maximum of one another, such as 1%, 5%, or 10%), and 27 may have been associated with a SIHA notification of failure to meet a memory benchmark test value. In such an example embodiment, the bagging algorithm may rank the distributed power CO2 emissions value as the usage profile user-disruptive static system configuration most likely to impact carbon footprint, incorporation of the same GPU as the next most likely to impact carbon footprint, usage of 80% or more of the CPU resources during execution of a videoconferencing application as the next most likely to impact carbon footprint, and failure to meet a memory benchmark test value as the least likely to impact carbon footprint for the first carbon footprint grouping.

The boosting algorithm in an embodiment may perform several iterations of this same process on several different carbon footprint groupings, some of which may overlap one another, in an embodiment. Upon execution of such multiple iterations, the bagging algorithm may combine the rankings produced by each iteration into a single ranking for all analyzed user profile characteristics across all client information handling systems in the enterprise system to determine an overall ranking of likelihood that each usage profile user-disruptive static system configuration may impact carbon footprint. For example, the bagging algorithm may average all rankings for all user-disruptive static system configurations across each iteration, may take a mean value, or may perform a weighting or nearest fit method. The overall bagging method ranking of likelihood that each usage profile user-disruptive static system configuration may impact carbon footprint in such an example embodiment may provide an indication of which client information handling systems may reasonably be expected to have similar carbon footprints based on similarity of specific (higher ranking) usage profile user-disruptive static system configuration.

In a second example embodiment, the usage profile based CO2 optimization system 280 may employ a stacking algorithm to model the importance of each of the usage profile user-disruptive static system configurations in determining a carbon footprint for each of the plurality of client information handling systems. In such an example embodiment, the usage profile based CO2 optimization system 280 may input carbon footprint and each of the user-disruptive static system configurations within the usage profile (e.g., hardware type for a plurality of components, software application usage details, hardware efficiency measurements, location) for a plurality of client information handling systems into a plurality of machine-learning modeling algorithms. Stacking harnesses the benefits of each of these various machine-learning modeling algorithms by combining their results into a single model. Because each of the various machine-learning modeling algorithms are associated with different strengths and weaknesses, such a combination may minimize associated weaknesses or errors.

Examples of such machine-learning modeling algorithms in an embodiment may include gradient descent, linear regression, logistic regression, linear discriminant analysis, classification and regression trees, naïve Bayes, K-Nearest neighbor, support vector machines, or learning vector quantization. These are only a few examples of modeling algorithms that may be used. It is contemplated that any known or later-developed modeling algorithm that compares an estimated classification or hypothesis (e.g., similarity in the type of processor is the most important characteristic for determining similar carbon footprint across a plurality of client information handling systems) against a known value (e.g., actual measured carbon footprints across client information handling systems sharing the same type of process) may be used. The end result for each of these models may indicate a usage profile user-disruptive static system configuration (e.g., hardware type, hardware resource consumption by particular software applications, hardware failures, location) most likely to impact carbon footprint for each of the client information handling systems in an embodiment. The stacking algorithm may conclude by generating a ranking of each of these usage profile user-disruptive static system configurations based on likelihood of impacting carbon footprint and on frequency with which each underlying machine-learning modeling algorithm designated that usage profile user-disruptive static system configuration as most likely to impact the carbon footprint. Thus, similar to the bagging algorithm described above, the stacking algorithm may provide an indication of which client information handling systems may reasonably be expected to have similar carbon footprints based on similarity of specific (higher ranking) usage profile user-disruptive static system configurations.

In a third example embodiment, the usage profile based CO2 optimization system 280 in an embodiment may perform a boosting algorithm to rank the importance of each of the usage profile user-disruptive static system configurations in determining a carbon footprint for each of a plurality of client information handling systems. In such an example embodiment, the boosting algorithm may also use a plurality of machine-learning models to predict which of the usage profile user-disruptive static system configurations is most likely to impact carbon footprint for a plurality of client information handling systems. In such an example embodiment, the usage profile based CO2 optimization system 280 may input carbon footprint and each of the characteristics within the usage profile (e.g., hardware type for a plurality of components, software application usage details, hardware efficiency measurements, location) for a plurality of client information handling systems into a plurality of machine-learning modeling algorithms.

The boosting algorithm may apply one or more machine-learning models similar to those described above with respect to the stacking algorithm to such input values through various iterations. In some example embodiments, the boosting algorithm may use the same machine-learning model for each iteration, and in other embodiments, various models may be used across different iterations. The boosting algorithm minimizes errors in such models not based on the variety of models used (e.g., as described with reference to stacking, above), but through weighting the input values to later iterations based on the output of previous iterations. For example, the boosting method may perform a first iteration machine-learning modeling algorithm (e.g., gradient descent method) to determine an error associated with an assumption that one of the usage profile user-disruptive static system configurations (e.g., similarity in the type of CPU) is most likely to impact carbon footprint at each of the client information handling systems. In the next iteration, the boosting method may perform the same or similar machine-learning modelling algorithm (e.g., gradient descent method) used in the first iteration on input values that have been weighted by the error function from the previous iteration. For example, the input into the second iteration may include values for the usage profile user-disruptive static system configuration defining similarity of CPU type that have been weighted by the error function from the first iteration. This algorithm may proceed through several iterations in an embodiment until the error function for the latest iteration reaches a threshold minimum value, for example.

The end result of each iteration may include an error associated with a determination that a given usage profile user-disruptive static system configuration is most likely to impact the carbon footprint for a client information handling system. These iteration outputs may be combined into a ranking of likelihood that each of the usage profile user-disruptive static system configurations may impact the carbon footprint for the client information handling system. For example, the usage profile user-disruptive static system configurations may be ranked by lowest associated error across all iterations to highest associated error to define most likely to impact carbon footprint to least likely to impact carbon footprint. Thus, similar to the bagging algorithm and stacking algorithm described above, the boosting algorithm may provide an indication of which client information handling systems may reasonably be expected to have similar carbon footprints based on similarity of specific (higher ranking) usage profile user-disruptive static system configurations.

In an embodiment, the rankings produced by the bagging, stacking, and boosting algorithms described above may be combined into a single ranking describing likelihood of each of the usage profile user-disruptive static system configurations in impacting the carbon footprint for a client information handling system. For example, such an ensemble approach may include averaging, taking the mean, or performing a least-squares fit of rankings produced by each of the bagging, stacking, and boosting algorithms to determine an ensemble rank for each usage profile user-disruptive static system configurations in determining carbon footprint.

At block 406, the usage profile based CO2 optimization system in an embodiment may group each of the client information handling systems together into CO2 optimization classifications based on machine-learning rankings for user-disruptive static system configurations and telemetry values for user-disruptive static system configurations for each of the plurality of client information handling systems. For example, in an embodiment, the ensemble rank described directly above may identify incorporation of an LCD display, highest hardware resource consumption rate by videoconferencing application, failure of memory to meet a benchmark test value, and location of the client information handling system as the first, second, third, and fourth most likely usage profile user-disruptive static system configurations to impact carbon footprint for a client information handling system.

In such an example embodiment, the usage profile based CO2 optimization system 280 may associate all client information handling systems whose telemetry values indicate incorporation of an LCD display into a first CO2 optimization classification, and save this association in telemetry 282. The usage profile based CO2 optimization system 280 in another aspect of such an example embodiment may associate all remaining client information handling systems (e.g., not included within the first CO2 optimization classification) whose telemetry values indicate the highest hardware resource consumption rate is caused by videoconferencing application execution into a second CO2 optimization classification, and save this association in telemetry 282. In still another aspect, the usage profile based CO2 optimization system 280 of such an example embodiment may associate all remaining client information handling systems (e.g., not included within the first or second CO2 optimization classifications) whose telemetry values indicate failure of memory to meet a benchmark test value into a third CO2 optimization classification, and save this association in telemetry 282. The usage profile based CO2 optimization system 280 in yet another aspect of such an example embodiment may associate all remaining client information handling systems (e.g., not included within the first, second, or third CO2 optimization classifications) whose telemetry values indicate the same location or a distributed power CO2 emissions value within a preset maximum tolerance of one another (e.g., 5%) into a fourth CO2 optimization classification, and save this association in telemetry 282.

In other embodiments, plural CO2 optimization classifications may be determined based on combinations of client information handling systems with telemetry values that match up for a plurality of user-disruptive static system configurations that are determined to have large levels of impact on CO2 consumption at client information handling systems. The various combinations of user-disruptive static system configuration characteristics, similar to those described for each of the example embodiments above for the first, second, third, fourth and so forth CO2 optimization classifications, may be determined to have commonality of combinations and be placed in a given CO2 optimization classifications based on the detected combinations described. In some embodiments, the combinations of user-disruptive static system configuration characteristics need not match all characteristics, but may have a correlation threshold value to be determined to belong in a particular CO2 optimization classification by the usage profile based CO2 optimization system 280.

In such a way, the usage profile based CO2 optimization system 280 may classify client information handling systems into groups within which it is reasonable to expect each member of the group to produce similar carbon footprints. As described below, with respect to FIG. 5, carbon footprints at some client information handling systems in each group may be decreased by mimicking various adjustable dynamic system configurations (e.g., hardware, software, and firmware usage and configurations) at client information handling systems within the same group but having a lower carbon footprint in comparison. The usage profile based CO2 optimization system in an embodiment may recommend client information handling systems within the group or classification described directly above at block 406 perform minor adjustments to these adjustable dynamic system configurations that are not likely to impact user experience in order to mimic functionality at other client information handling systems within the same group having lower carbon footprints. The method for grouping a plurality of client information handling systems into CO2 optimization classifications based on usage profiles for streamlining CO2 optimizing recommendations may then end.

FIG. 5 is a flow diagram illustrating a method of recommending hardware, software, or firmware usage or configuration adjustments to minimize carbon footprint across a plurality of client information handling systems based on optimal configurations at comparable client information handling systems according to an embodiment of the present disclosure. As described herein, the usage profile based CO2 optimization system in an embodiment may determine recommendations to adjust software application usage (e.g., by limiting access to resources of given hardware components), hardware policy settings, and firmware versions and update settings at client information handling systems in order to minimize CO2 footprints of each of the plurality of client information handling systems. After grouping client information handling systems in CO2 optimization classifications according to the user-disruptive static system configurations defining a usage profile for each client information handling system, the usage profile based CO2 optimization system in an embodiment may identify one or more adjustable dynamic system configurations of various client information handling systems in each CO2 optimization classification that may be adjustable to decrease or optimize the CO2 footprint at each of the plurality of client information handling systems.

At block 502, the usage profile based CO2 optimization system in an embodiment may identify a plurality of client information handling systems with the same CO2 optimization classification. As described above with reference to FIG. 4, classification of a plurality of client information handling systems into the same CO2 optimization classification may indicate a reasonable expectation of similar carbon footprints between the client information handling systems. As also described herein, these classifications may be made based on similarity of usage profile user-disruptive static system configurations that are not easily adjustable by the user, or whose adjustment may negatively impact user experience, causing a user to likely reject a recommendation to make such an adjustment. However, within these classification groups, smaller adjustments may be made by a user to adjustable dynamic system configurations to minimize carbon footprint, such as changes to hardware, software, or firmware configuration or usage. These adjustments to adjustable dynamic system configurations may be determined based on configuration or usage at a most CO2 optimal client information handling system within each classification group. Because the carbon footprint for client information handling systems within each classification group are likely to be similar, the recommended adjustments may also be likely to optimize carbon footprint across all devices. In contrast, adjustments to adjustable dynamic system configurations made to client information handling systems that have vastly different carbon footprints due to the usage profile user-disruptive static system configurations considered during such categorization (e.g., similarity in hardware types, similarity in software usage, location or distributed power CO2 emissions values, or hardware failures) may not positively impact carbon footprint at other client information handling systems, or may not be achievable at those client information handling systems.

The usage profile based CO2 optimization system in an embodiment may identify a first client device in the configuration grouping having a lowest CO2 emissions value as an optimal device for CO2 optimization classification at block 504. For example, as described above with reference to FIG. 4 at block 402, the usage profile based CO2 optimization system in an embodiment may also determine and store in telemetry a carbon footprint for each of the client information handling systems for which telemetry has been received using the power consumed by the client information handling system recorded in telemetry, the duration of such consumption, and a distributed power CO2 emissions value. The usage profile based CO2 optimization system may analyze these carbon footprint determinations stored in telemetry for each of the client information handling systems within the same CO2 optimization classification to identify an optimal device having a lowest carbon footprint.

At block 506, the usage profile based CO2 optimization system in an embodiment may identify the second client device in the same configuration category as a device of interest. The usage profile based CO2 optimization system may compare various adjustable dynamic system configurations (e.g., hardware, software, or firmware configurations or usage values) stored in telemetry for the second client information handling system against those same adjustable dynamic system configurations of the optimal device in order to determine adjustments that may be made to the adjustable dynamic system configurations to optimize carbon footprint at the second client information handling system. As described herein, such adjustable dynamic system configurations in various embodiments may include various hardware policy settings, background software application usage, software and firmware update settings, and versions of firmware installed, for example.

The usage profile based CO2 optimization system in an embodiment at block 508 may determine whether the device of interest has a different hardware policy setting than the optimal device. Various hardware policy settings in an embodiment may be considered an adjustable dynamic system configuration in an embodiment because they could cause the device of interest to consume more power than the optimal device, thus increasing the carbon footprint for the device of interest. For example, hardware configurations currently in place at the device of interest may be optimized for performance, rather than power consumption. This may be determined, in an example embodiment, with reference to the JSON incidents for the device of interest stored in telemetry. For example, the usage profile based CO2 optimization system 250 may identify the JSON event named "incident class," having a value "config," indicating one or more hardware components may be configured for high performance rather than for low power consumption. Upon identification of the JSON incident classification under the configuration classifier, the usage profile based CO2 optimization system 250 in such an embodiment may further search the JSON incident to identify which hardware components are currently configured for high performance. For example, the usage profile based CO2 optimization system 250 in an embodiment may identify the JSON event named "NID 2 data transceived," having a value of 100 GB, which may be above a preset high power transmission threshold value of 10 GB, to identify the WWAN interface device (e.g., 220) as currently configured for high performance (high data transmission), rather than low power consumption.

As another example, the usage profile based CO2 optimization system 250 in an embodiment may identify the JSON event named "display mode," having a value of "high_definition," to identify the display device 245 as currently configured for high performance (high definition display), rather than low power consumption. As still another example, the usage profile based CO2 optimization system 250 in an embodiment may identify the JSON event named "camera detection mode," having a value of "continuous monitor," or the JSON event named "camera capture mode," having a value of "high resolution," to identify the camera 248 as currently configured for high performance (continuous monitoring and high resolution image capture), rather than low power consumption. In another example, the usage profile based CO2 optimization system 250 may determine that the GPS unit 249 is currently set to continuous location determination, or determination of location at a relatively high frequency (e.g., once per minute). In yet another example, the usage profile based CO2 optimization system 250 may identify one or more software or firmware applications consuming a large proportion of CPU resources. If the device of interest does have a different hardware policy setting, the method may proceed to block 510 for recommendation of adjustments to hardware policy settings at the device of interest based on policy settings at the optimal device. If the device of interest does not have a different hardware policy setting, the method may proceed to block 512 for analysis of background application usage.

At block 510, in an embodiment in which the device of interest has a different hardware policy setting than the optimal device, the usage profile based CO2 optimization system may recommend adjustment to the hardware policy settings at the device of interest based on hardware policy settings at the optimal device, to lower carbon footprint at the device of interest. For example, the usage profile based CO2 optimization system 250 in an embodiment may recommend, via a graphical user interface (GUI) that the user decrease power supplied to the network interface device, or shift transmission of data from one network interface device to another, lower power network interface device. More specifically, in an embodiment in which the usage profile based CO2 optimization system 250 determines the WWAN interface device or WLAN interface device (e.g., 220) is currently configured for high performance (high data transmission), rather than low power consumption, the usage profile based CO2 optimization system 250 may recommend to the user, via the GUI 290, that the user decrease power made available to the WWAN or WLAN interface device 220.

The usage profile based CO2 optimization system in another embodiment may recommend to the user, via a GUI, placing the display into a power savings or standard definition mode. For example, in an embodiment in which the usage profile based CO2 optimization system 250 determines the display device **245*a* is currently configured for high performance (high definition display), rather than low power consumption, the usage profile based CO2 optimization system 250 may recommend, via GUI 290, that the user adjust the policies for the display 245*a* to place the display in a standard definition mode or a low power mode. In another example embodiment, the usage profile based CO2 optimization system 250 may recommend to the user, via GUI 290, that the user adjust the policies for the camera 248 to turn off continuous monitoring or decrease image capture resolution. The method may then proceed to block 512** for analysis of background application usage at the device of interest.

In an embodiment, the usage profile based CO2 optimization system at block 512 may determine whether the device of interest uses background applications differently than the optimal device. For example, the usage profile based CO2 optimization system 250 in an embodiment may determine whether the device of interest is executing background applications, and the consumption of hardware component resources by each of those background applications based on JSON incidents generated based on application analytics stored in telemetry 282. More specifically, the usage profile based CO2 optimization system 250 may determine that the hardware resource consumption by background software applications at the device of interest is greater than the hardware resource consumption by background software applications at the optimal device by a threshold background application comparison value (e.g., 50%, 35%, 20%). In another example embodiment, the usage profile based CO2 optimization system 250 may determine that background applications at the device of interest are consuming hardware component resources above a maximum background usage value. If the device of interest does use background applications differently than the optimal device, the method may proceed to block 514 for recommendation of adjustments to background software usage at the device of interest based on such usage at the optimal device. If the device of interest does not use background applications differently than the optimal device, the method may proceed to block 516 for analysis of software and firmware update settings.

At block 514, in an embodiment in which the device of interest uses background applications differently than the optimal device, the usage profile based CO2 optimization system may recommend adjustment to the background application usage at the device of interest based on such usage at the optimal device, to lower carbon footprint at the device of interest. For example, in an embodiment in which one or more background software applications are using hardware resources at a maximum background usage value (e.g., 85%), the device of interest may recommend decreasing the usage of those hardware component resources for those background applications by ten percent. In some cases, such a recommendation may be triggered by a single background software application using hardware component resources above the maximum background usage value. In other cases, such a recommendation may be triggered by a plurality of background software applications which are, in combination, consuming hardware component resources meeting or exceeding the maximum background usage value. In an embodiment, the background software application(s) may be consuming resources of a single hardware component meeting the maximum background usage value. In such an embodiment, the recommendation may be to decrease usage by the background software application(s) of only resources at that hardware component (e.g., CPU). In other embodiments, the background software application(s) may be consuming resources of a plurality of hardware components meeting the maximum background usage value. In such an embodiment, the recommendation may be to decrease usage by the background software application(s) of resources at each of those hardware components (e.g., CPU, memory). Also, the recommended percentage of decrease may vary. For example, the recommendation may be to decrease usage (e.g., by restricting resources of the given hardware component made available to the specific software application) by less than ten percent or to terminate usage of certain applications (e.g., background applications) entirely and from the client information handling system for other tasks in the enterprise to extend lifetime of parts. The method may then proceed to block 516 for analysis of firmware and software update settings at the device of interest.

In an embodiment, the usage profile based CO2 optimization system at block 516 may determine whether the device of interest performs software or firmware updates differently than the optimal device. For example, the usage profile based CO2 optimization system may determine, with reference to stored telemetry 282 whether the device of interest is performing software updates more frequently, or less efficiently. The SIHA 283 in an embodiment may search telemetry 282 data to identify indications within the indexed and classified JSON incidents of inefficient or unnecessary firmware or software updates and poor driver performance. For example, the SIHA 283 in an embodiment may search the indexed and classified JSON incident described above to identify the JSON event named "incident class," having a value "driver perf," indicating poor driver performance, and identify the JSON event named "unsuccessful driver install attempts," having a value of "display_driver_14.3," or the JSON event named "device driver call failure rate," having a value of 0.55, which may be above a preset maximum driver call failure rate of 50%. Either of these JSON events so identified by the SIH 283 in an embodiment may indicate that the display device driver is the underperforming driver that caused the JSON incident to be classified under the driver performance classification. In such an embodiment, the SIHA 283 may reference the JSON event "display_driver_version," having a value of 14.2 to identify that version 14.2 of the display driver is currently operating at the first client information handling system 200. If the device of interest does perform software or firmware updates differently than the optimal device, the method may proceed to block 518 for recommendation of adjustments to update methods at the device of interest based on such update methods at the optimal device. If the device of interest does not perform software or firmware updates differently than the optimal device, the method may proceed to block 520 for analysis of firmware versions.

At block 518, in an embodiment in which the device of interest performs software or firmware updates differently than the optimal device, the usage profile based CO2 optimization system may recommend adjustment to the software or firmware update methods at the device of interest based on such update methods at the optimal device, to lower carbon footprint at the device of interest. For example, the usage profile based CO2 optimization system 250 in an embodiment may pause repeated attempts at unsuccessful installations of drivers. In an embodiment, reducing or eliminating repeated unsuccessful attempts also reduces unnecessary power consumption to further reduce levels of CO2 or other GHG production below acceptable or set levels by a client information handling system. For example, the usage profile based CO2 optimization system 250 may reference the indexed and classified JSON incident above to identify the JSON event named "unsuccessful driver install attempts," having a value of "display_driver_14.3," indicating a failed attempt at installing the display driver version 14.3. In such a scenario, the usage profile based CO2 optimization system 250 may recommend that the user pause or terminate future attempts at installing the display driver version 14.3. The method may then proceed to block 520 for analysis of firmware versions at the device of interest.

In an embodiment, the usage profile based CO2 optimization system at block 520 may determine whether the device of interest has different versions of firmware than the optimal device. For example, the usage profile based CO2 optimization system 250 may reference the indexed and classified JSON incident above to identify the JSON event "display_driver_14.3," indicating current use of the display driver version 14.3 at the device of interest. The usage profile based CO2 optimization system 250 in such an embodiment may perform a similar analysis of telemetry 282 to determine the optimal device is currently using the display driver version 15.0. If the device of interest does have different versions of firmware, the method may proceed to block 522 for recommendation to update the firmware drivers. If the device of interest does not have a different version of firmware, the method may proceed to block 524 for transmission of all generated recommendations from blocks 510, 514, 518, or 522, if any to the device of interest. Blocks 508, 512, 516 and 520 assess just a sample embodiment of possible adjustable dynamic system configuration characteristics to be mimicked from the first client device by other client devices in the same CO2 optimization classification. However, it is contemplated that any number of additional adjustable dynamic system configuration characteristics that may not be disruptive to a user-experience in an adjustable dynamic system configuration may be assessed for potential to mimic the first client device in additional example embodiments.

At block 522, the usage profile based CO2 optimization system in an embodiment may recommend installation of updated drivers at the device of interest. For example, the usage profile based CO2 optimization system 250 may reference the JSON incidents for the device of interest and for the optimal device to determine that the optimal device is running version 15.0 of the display driver, while the device of interest is still running version 14.3. In such an example embodiment, the usage profile based CO2 optimization system 250 may recommend that the user download the most recent version of that driver. The usage profile based CO2 optimization system 250 in such an embodiment may further recommend deletion of previous versions of the driver that may interfere with proper execution of the most recent version of the driver, thus generating additional power consumption and unnecessary CO2 or GHG production at the distributed power CO2 emissions value applied to the power used. The method may then proceed to block 524.

The usage profile based CO2 optimization system in an embodiment at block 524 may transmit any recommendations determined at blocks 510, 514, 518, or 522 for adjustment of one or more adjustable dynamic system configurations to the device of interest. As described herein, these recommendations may decrease the carbon footprint of the device of interest such that it is closer to the carbon footprint for the optimal device within the same CO2 optimization classification group. The user at the device of interest may then choose whether to perform the recommended adjustments to the adjustable dynamic system configurations.

At block 526, the usage profile based CO2 optimization system in an embodiment may determine whether all client devices within the CO2 optimization classification group have been analyzed for CO2 optimization based on adjustments to adjustable dynamic system configurations (e.g., hardware, software, or firmware configurations or usage) at the optimal device for that classification group. If there are remaining client devices within the CO2 optimization classification group identified at block 502 in an embodiment, the method may proceed to block 528 for analysis of a remaining client device. If there are no remaining client devices within the CO2 optimization classification group, the method may then end.

The usage profile based CO2 optimization system in an embodiment at block 528 may identify the next client device in the classification group identified at block 502 as the next device of interest. The method may then proceed back to block 508 for analysis of differences between various adjustable dynamic system configurations (e.g., hardware, software, or firmware usage or configuration) between the new device of interest and the optimal device. By repeating the loop between blocks 528 and 508 in such a way, the usage profile based CO2 optimization system in an embodiment may recommend changes to the adjustable dynamic system configurations (e.g., hardware, software, or firmware usage or configuration) across a plurality of client information handling systems with similar carbon footprints based on an optimal usage or configuration to minimize carbon footprint across all client information handling systems within the same CO2 optimization classification group.

The blocks of the flow diagrams of FIGS. 3, 4, and 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another may communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims.

In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A usage profile based CO2 optimization system of an information handling system comprising:

a hardware processor, memory, and a power management unit to supply power to the hardware processor and the memory;

the hardware processor executing code instructions of an ensemble machine-learning algorithm of the usage profile based CO2 optimization system to determine rankings for each of a plurality of user-disruptive static system configurations determined to be disruptive for users to adjust for a plurality of client information handling systems according to a level at which each of the user-disruptive static system configurations impacts carbon footprints during operation in each user-disruptive static system configuration, wherein the rankings are used to determine similarity among functional capabilities of the user-disruptive static system configurations for the plurality of client information handling systems;

the hardware processor executing code instructions to receive first telemetry event logs in a first Javascript object notation (JSON) file of configuration and power consumption, processor operation, and network interface system operations to classify a first client information handling system within a CO2 optimization classification, based on a first value for a highest ranked user-disruptive static system configuration of the first client information handling system;

the hardware processor executing code instructions to receive second telemetry event logs in a second JSON file of configuration and power consumption, processor operation, and network interface system operations to classify a second client information handling systems within the CO2 optimization classification, based on a second value for the highest ranked user-disruptive static system configuration of the second client information handling system;

the hardware processor executing code instructions to determine from output of the ensemble machine-learning algorithm of the usage profile based CO2 optimization system that the first client information handling system has a smaller carbon footprint than the second client information handling system and identify a first adjustable dynamic system configuration for the first client information handling system does not match a second adjustable dynamic system configuration for the second client information handling system, where adjustments to the adjustable dynamic system configuration are not determined to be user-disruptive; and a network interface device to transmit a recommendation to the second client information handling system to adopt the first adjustable dynamic system configuration to decrease the carbon footprint of the second client information handling system.

2. The information handling system of claim 1, wherein the user-disruptive static system configuration includes a hardware component type.

3. The information handling system of claim 1, wherein the user-disruptive static system configuration includes a measure of hardware component resource consumption by an executing software application.

4. The information handling system of claim 1, wherein the adjustable dynamic system configuration includes hardware policy settings.

5. The information handling system of claim 1, wherein the adjustable dynamic system configuration includes a performance mode for a hardware component.

6. The information handling system of claim 1, wherein the adjustable dynamic system configuration includes a power conservation setting for a hardware component.

7. The information handling system of claim 1, wherein the adjustable dynamic system configuration includes a limitation of hardware component resources consumed during execution of background software applications.

8. A method of executing code instructions of a usage profile based CO2 optimization system at an information handling system for optimizing carbon footprint for a client information handling system based on a usage profile comprising:

determining, via a processor executing code instructions of, using an ensemble machine-learning algorithm for the usage profile based CO2 optimization system, rankings for each of a plurality of user-disruptive static system configurations determined to be disruptive for users to adjust for a plurality of client information handling systems according to a level at which each of the user-disruptive static system configurations impacts carbon footprints during operation in each user-disruptive static system configuration, wherein the rankings are used to determine similarity among functional capabilities of the user-disruptive static system configurations for the plurality of client information handling systems;

receiving first telemetry event logs in a first Javascript object notation (JSON) file of configuration and power consumption, processor operation, and network interface system operations as well as first location data for input into the ensemble machine-learning algorithm for classifying, via the hardware processor executing code instructions, a first client information handling system within a CO2 optimization classification, based on a first value for a highest ranked user-disruptive static system configuration of the first client information handling system;

receiving second telemetry event logs in a second JSON file of configuration and power consumption, processor operation, and network interface system operations as well as second location data for input into the ensemble machine-learning algorithm for classifying, via the hardware processor executing code instructions, a second client information handling systems within the CO2 optimization classification, based on a second value for the highest ranked user-disruptive static system configuration of the second client information handling system;

determining, via the hardware processor executing code instructions, from output of the ensemble machine-learning algorithm that the first client information handling system has a smaller carbon footprint than the second client information handling system;

identifying via the hardware processor executing code instructions, a first adjustable dynamic system configuration for the first client information handling system does not match a second adjustable dynamic system configuration for the second client information handling system, where adjustments to the adjustable dynamic system configuration are not determined to be user-disruptive; and transmitting, via a network interface device, a recommendation to the second client information handling system to adopt the first adjustable dynamic system configuration to decrease the carbon footprint of the second client information handling system.

9. The method of claim 8, wherein the adjustable dynamic system configuration includes background software application usage.

10. The method of claim 8, wherein the adjustable dynamic system configuration includes software or firmware update settings.

11. The method of claim 8, wherein the adjustable dynamic system configuration includes a version of firmware installed.

12. The method of claim 8, wherein the user-disruptive static system configuration includes measured locations of the first and the second client information handling systems.

13. The method of claim 8, wherein the user-disruptive static system configuration includes measured health of a hardware component.

14. The method of claim 8, wherein the ensemble machine-learning algorithm is a stacking machine-learning algorithm executing a gradient descent method.

15. A usage profile based CO2 optimization system of an information handling system comprising:

a hardware processor, memory, and a power management unit to supply power to the hardware processor and the memory;

the hardware processor executing code instructions of an ensemble machine-learning algorithm of the usage profile based CO2 optimization system to: determine, using rankings for each of a plurality of user-disruptive static system configurations determined to be disruptive for users to adjust for a plurality of client information handling systems according to a level at which each of the user-disruptive static system configurations impacts carbon footprints during operation in each user-disruptive static system configuration, wherein the rankings are used to determine similarity among functional capabilities of the user-disruptive static system configurations for the plurality of client information handling systems;

the hardware processor executing code instructions to receive first telemetry event logs in a first Javascript object notation (JSON) file of configuration and power consumption, processor operation, and network interface system operations to classify a first client information handling system within a CO2 optimization classification, based on a first value for a highest ranked user-disruptive static system configuration of the first client information handling system;

the hardware processor executing code instructions to receive second telemetry event logs in a second JSON file of configuration and power consumption, processor operation, and network interface system operations to classify a second client information handling systems within the CO2 optimization classification, based on a second value for the highest ranked user-disruptive static system configuration of the second client information handling system;

the hardware processor executing code instructions to determine from output of the ensemble machine-learning algorithm of the usage profile based CO2 optimization system that the first client information handling system has a smaller carbon footprint than the second client information handling system and to identify a first adjustable dynamic system configuration for the first client information handling system does not match a second adjustable dynamic system configuration for the second client information handling system; and a network interface device to transmit a recommendation to the second client information handling system to adopt the first adjustable dynamic system configuration to decrease the carbon footprint of the second client information handling system.

16. The information handling system of claim 15, wherein the plurality of ensemble machine-learning algorithm includes a bootstrap aggregation (BOOST) machine-learning algorithm.

17. The information handling system of claim 15, wherein the plurality of ensemble machine-learning algorithms includes a stacking machine-learning algorithm.

18. The information handling system of claim 15, wherein the plurality of ensemble machine-learning algorithms includes a boosting machine-learning algorithm.

19. The information handling system of claim 15 further comprising:

the processor to determine the rankings for each of the user-disruptive static system configurations by combining estimated rankings output by each of the plurality of ensemble machine-learning algorithms into an overall ranking for each of the user-disruptive static system configurations.

20. The information handling system of claim 15 further comprising:

the processor to determine the rankings for each of the user-disruptive static system configurations by averaging estimated rankings output by each of the plurality of ensemble machine-learning algorithms into an overall ranking for each of the user-disruptive static system configurations.

* * * * *